United States Patent
Abe et al.

(10) Patent No.: US 8,678,935 B2
(45) Date of Patent: Mar. 25, 2014

(54) STORAGE MEDIUM HAVING GAME PROGRAM STORED THEREIN, GAME APPARATUS, GAME SYSTEM, AND GAME PROCESSING METHOD

(75) Inventors: Goro Abe, Kyoto (JP); Tomoyuki Yambe, Sendai (JP); Norihiro Sugita, Sendai (JP); Makoto Yoshizawa, Sendai (JP); Tadao Nakayama, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 345 days.

(21) Appl. No.: 12/856,885

(22) Filed: Aug. 16, 2010

(65) Prior Publication Data

US 2011/0294581 A1    Dec. 1, 2011

(30) Foreign Application Priority Data

May 25, 2010    (JP) ................. 2010-119847

(51) Int. Cl.
    *A63F 13/00*    (2006.01)
(52) U.S. Cl.
    USPC .............................................. 463/43; 463/36
(58) Field of Classification Search
    USPC ........................................... 463/36, 37, 43, 7
    See application file for complete search history.

(56) References Cited

U.S. PATENT DOCUMENTS

| | | | |
|---|---|---|---|
| RE34,728 E * | 9/1994 | Hall-Tipping | 463/23 |
| 5,772,508 A * | 6/1998 | Sugita et al. | 463/36 |
| 5,860,860 A * | 1/1999 | Clayman | 463/36 |
| 5,910,046 A * | 6/1999 | Wada et al. | 463/6 |
| 7,301,528 B2 * | 11/2007 | Marvit et al. | 345/156 |
| 2007/0106483 A1 * | 5/2007 | Kelley et al. | 702/141 |
| 2007/0167203 A1 * | 7/2007 | Yamada et al. | 463/7 |
| 2007/0207858 A1 * | 9/2007 | Breving | 463/36 |
| 2007/0243920 A1 * | 10/2007 | Kashima | 463/13 |
| 2008/0098448 A1 * | 4/2008 | Mondesir et al. | 725/126 |
| 2008/0171596 A1 * | 7/2008 | Hsu | 463/39 |
| 2008/0227546 A1 * | 9/2008 | Roberts | 463/38 |
| 2009/0215533 A1 * | 8/2009 | Zalewski et al. | 463/32 |
| 2011/0009193 A1 * | 1/2011 | Bond et al. | 463/36 |

FOREIGN PATENT DOCUMENTS

JP    10-24172    1/1998

\* cited by examiner

*Primary Examiner* — Arthur O. Hall
*Assistant Examiner* — Allen Chan
(74) *Attorney, Agent, or Firm* — Nixon & Vanderhye P.C.

(57) ABSTRACT

A biological signal is obtained from a player, under a situation where a biological parameter can be calculated based on a biological signal repeatedly obtained from a sensor attached to a player, and a predetermined game processing can be performed using the biological parameter. Then, whether the sensor is attached to the player is determined based on the biological signal, and the predetermined game processing is performed in at least one of a case where the sensor attachment determining means determines that the sensor has changed from its attached state to its detached state and a case where the sensor attachment determining means determines that the sensor has changed from its detached state to its attached state, according to the timing at which the determinations is made.

23 Claims, 17 Drawing Sheets

F I G. 5
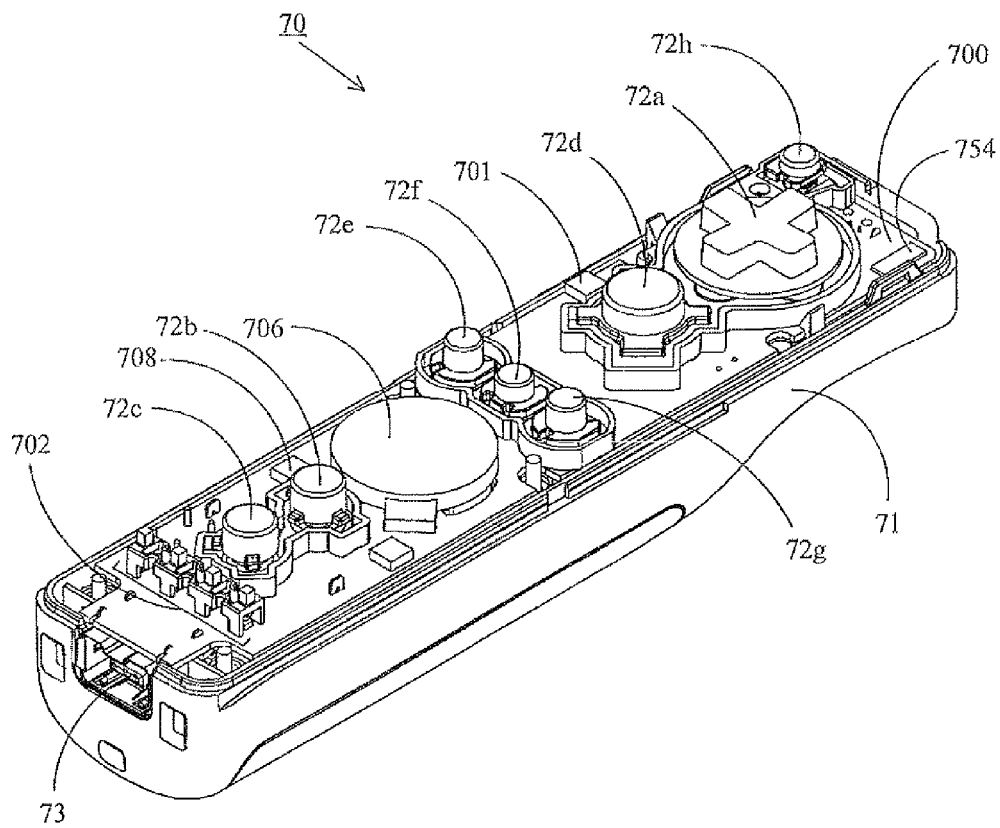

F I G. 1 5
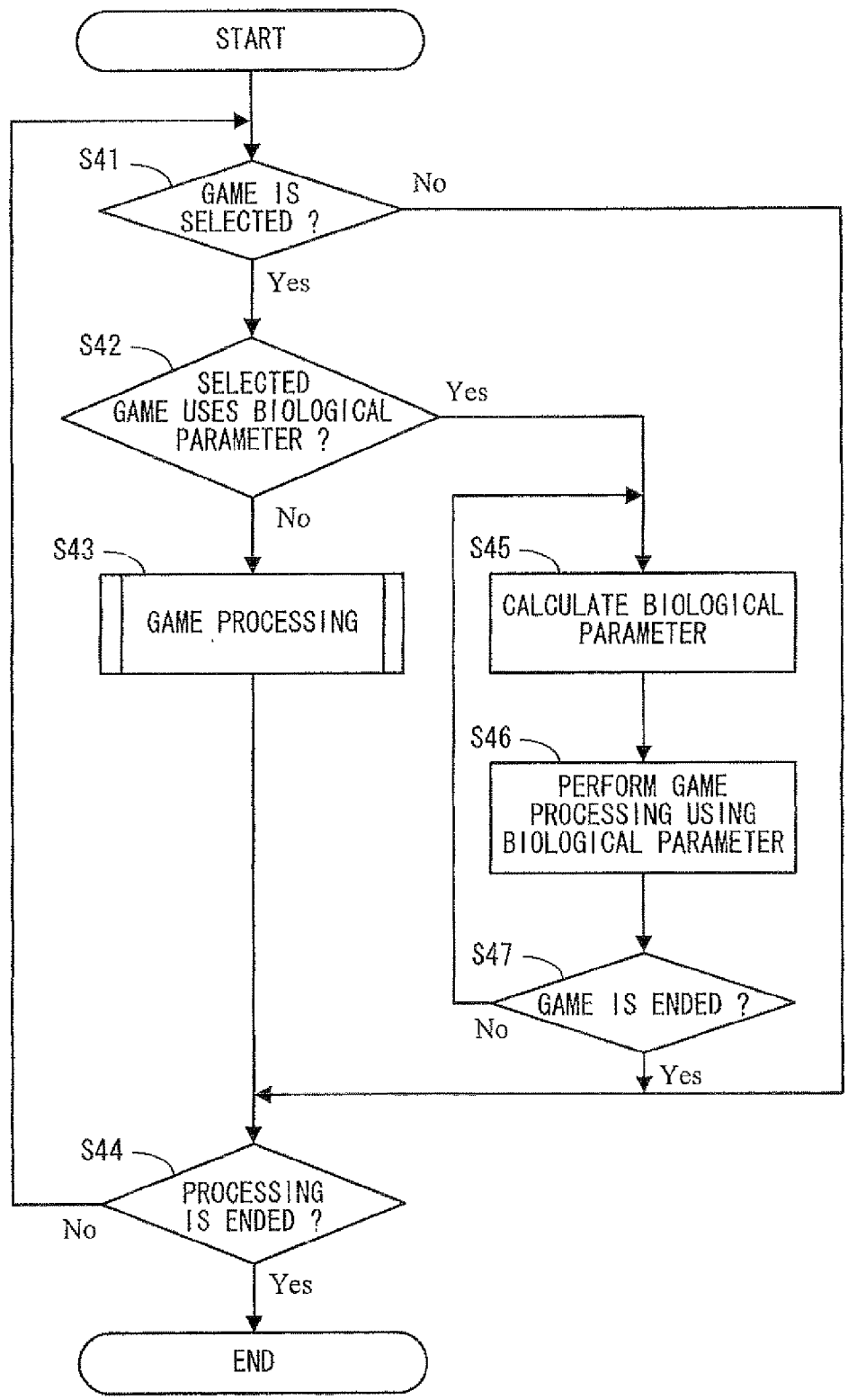

STORAGE MEDIUM HAVING GAME PROGRAM STORED THEREIN, GAME APPARATUS, GAME SYSTEM, AND GAME PROCESSING METHOD

CROSS REFERENCE TO RELATED APPLICATION

The disclosure of Japanese Patent Application No. 2010-119847, filed on May 25, 2010, is incorporated herein by reference.

BACKGROUND OF THE INVENTION

1. Field of the Invention

The present invention relates to a storage medium having a game program stored therein, a game apparatus, a game system, and a game processing method, and more particularly, to a storage medium having a game program stored therein, a game apparatus, a game system, and a game processing method, which are capable of performing a predetermined game processing based on a biological signal obtained from a player.

2. Description of the Background Art

Conventionally, for example, Japanese Laid-Open Patent Publication No. 10-024172 (hereinafter referred to as Patent Document 1) discloses a game which is performed based on heartbeat data obtained from a heartbeat detector that a player wears. In a game machine disclosed in Patent Document 1, the color of the face of a character controlled by the player is changed, or the size of the arm or fist of the character is changed, based on the heartbeat data obtained from the player.

In order to obtain a biological parameter such as the heartbeat or pulse of a player, it is necessary to continuously obtain a biological signal indicating such as a pulse wave directly obtained from the player, and calculate the biological parameter based on the continuously obtained biological signal. That is, when the biological parameter is calculated based on the biological signal continuously obtained from the player per unit time and game processing is performed based on the calculated biological parameter, a certain amount of time is required until the biological signal obtained from the player is reflected to the game processing. The game machine disclosed in Patent Document 1 performs, based on the biological parameter, game processing in which the timing of changing the color of the face of the character controlled by the player or the timing of changing the size of the arm or fist of the character is not required to be very precise. Accordingly, in the game machine disclosed in Patent Document 1, even if a time lag occurs between when the game machine starts to obtain the biological signal and when it starts to obtain the biological parameter, such a time lag does not cause a serious problem. However, when performing game processing in which the timing to control an object must be precise, such a time lag may cause a deterioration in responsiveness, and thus precise control cannot be realized.

SUMMARY OF THE INVENTION

Therefore, an object of the present invention is to provide a storage medium having a game program stored therein, a game apparatus, a game system, and a game processing method, which are capable of performing highly-responsive game processing in a situation where a biological parameter can be calculated based on a biological signal obtained from a player.

The present invention has the following features to attain the object mentioned above.

A first aspect of the present invention is directed to a computer-readable storage medium having stored therein a game program which causes a computer of a game apparatus, that is capable of calculating a biological parameter based on a biological signal repeatedly obtained from a sensor attached to a player, and performing a predetermined game processing using the biological parameter, to operated as biological signal obtaining means, sensor attachment determining means, and first game processing means. The biological signal obtaining means obtains the biological signal. The sensor attachment determining means determines, based on the biological signal, whether the sensor is attached to the player. The first game processing means performs, in at least one of a case where the sensor attachment determining means determines that the sensor has changed from its attached state to its detached state and a case where the sensor attachment determining means determines that the sensor has changed from its detached state to its attached state, a predetermined game processing according to a timing at which the determinations is made.

Thus, under a situation where a biological parameter is calculable based on a biological signal obtained from the player, a game processing is performed according to a timing based on the biological signal. Therefore, a highly-responsive game processing is realized.

As a first example, the sensor attachment determining means may determine that the sensor is in one of the attached state and the detached state if the value of the biological signal obtained by the biological signal obtaining means is equal to or greater than a predetermined threshold value, and may determine that the sensor is in the other state if the value of the biological signal obtained by the biological signal obtaining means is smaller than the threshold value.

As a second example, the sensor attachment determining means may determine that the sensor is in one of the attached state and the detached state if the value of the biological signal obtained by the biological signal obtaining means is within a predetermined range, and may determine that the sensor is in the other state if the value of the biological signal obtained by the biological signal obtaining means is outside the range.

As a third example, the sensor attachment determining means may determine that the sensor has changed from the attached state to the detached state or has changed from the detached state to the attached state if an amount of change in the value of the biological signal obtained by the biological signal obtaining means is equal to or greater than a predetermined threshold value, and may determine that the sensor's attachment state is not changed if the amount of change in the value of the biological signal obtained by the biological signal obtaining means is smaller than the threshold value.

Thus, according to the first to third examples, it is possible to determine, based on the biological signal, with high responsiveness, whether the player wears the sensor.

Alternatively, the first game processing means may move an object in a virtual game world in accordance with the timing at which the determination is made.

Thus, the object in the virtual game world can be moved depending on whether the player wears the sensor.

Alternatively, the first game processing means may include game starting means, elapsed time counting means, and result processing means. The game starting means starts, if the sensor attachment determining means determines that the sensor has changed from the detached state to the attached state, a game from the timing at which the determination is made. The elapsed time counting means counts an elapsed time after the game starting means has started the game. The result processing means performs, if the sensor attachment determining means determines that the sensor has changed from the attached state to the detached state, a processing in accordance with the elapsed time that is counted by the elapsed time counting means at the timing when the determination is made.

Alternatively, the first game processing means may display, on a display device, a game image representing a game in which a player competes for a time length from when the sensor attachment determining means determines that the sensor has changed from the detached state to the attached state to when the sensor attachment determining means determines that the sensor has changed from the attached state to the detached state. The game starting means may display, on the display device, a game image representing that the game is started, when the sensor attachment determining means determines that the sensor has changed from the detached state to the attached state. The result processing means may display, on the display device, a result according to the elapsed time counted by the elapsed time counting means, when the sensor attachment determining means determines that the sensor has changed from the attached state to the detached state.

Thus, it is possible to realize a game in which the player competes for a time from when the player wears the sensor to when the player removes the sensor.

Alternatively, the first game processing means may include determination time setting means. The determination time setting means sets a first determination time for determining, in the game in which the player competes for the time length, the rank of the game result with respect to the time length. In this case, the result processing means may display, on the display device, the rank of the game result, depending on whether the elapsed time at the timing when the sensor attachment determining means determines that the sensor has changed from the attached state to the detached state is shorter than the first determination time.

Thus, it is possible to realize a game in which the rank of the game result is determined depending on whether the time from when the player wears the sensor to when the player removes the sensor is longer or shorter than the determination time.

Alternatively, the result processing means may display, on the display device, that the player has succeeded in the game, when the elapsed time at the timing when the sensor attachment determining means determines that the sensor has changed from the attached state to the detached state is shorter than the first determination time. The result processing means may display, on the display device, that the player has failed in the game, when the sensor attachment determining means has not yet determined that the sensor has changed from the attached state to the detached state, at the timing when the elapsed time has reached the first determination time.

Thus, it is possible to realize a game in which the player fails in the game when the time from when the player wears the sensor to when the player removes the sensor reaches the determination time.

Alternatively, the determination time setting means may set a second determination time shorter than the first determination time, for determining the rank of the game result. In this case, the result processing means may display, on the display device, that the player has succeeded in the game, when the elapsed time at the timing when the sensor attachment determining means determines that the sensor has changed from the attached state to the detached state is equal to or longer than the second determination time and is shorter than the first determination time. The result processing means may display on the display device, that the player has failed in the game, when the elapsed time at the timing when the sensor attachment determining means determines that the sensor has changed from the attached state to the detached state is shorter than the second determination time. The result processing means may display, on the display device, that the player has failed in the game, when the sensor attachment determining means has not yet determined that the sensor has changed from the attached state to the detached state, at the timing when the elapsed time has reached the first determination time.

Thus, it is possible to realize a game in which the player succeeds in the game only when the time from when the player wears the sensor to when the player removes the sensor is equal to or longer than the second determination time and is shorter than the first determination time.

Alternatively, the result processing means may display, on the display device, in addition to the rank of the game result, a game result depending on a difference between the first determination time and the elapsed time at the timing when the sensor attachment determining means determines that the sensor has changed from the attached state to the detached state.

Thus, it is possible to realize a game in which the game result varies depending on a difference between the determination time and the time from when the player wears the sensor to when the player removes the sensor.

Alternatively, the result processing means may represent that the player has succeeded in the game, and may display, on the display device, a game score depending on the elapsed time, when the elapsed time at the timing when the sensor attachment determining means determines that the sensor has changed from the attached state to the detached state is shorter than the first determination time.

Thus, it is possible to realize a game in which the player fails in the game when the time from when the player wears the sensor to when the player removes the sensor reaches the determination time, and a game score is determined depending on the length of the time from when the player wears the sensor to when the player removes the sensor.

Alternatively, the first game processing means may perform a game in which a player competes for whether an object selected by the player from among a plurality of objects is a correct object or a wrong object. The first game processing means may include object selection means for selecting, when the sensor attachment determining means determines that the sensor has changed from the detached state to the attached state, one object from among the plurality of objects in accordance with the timing at which the determination is made. The result processing means determines whether the object selected by the object selection means is a correct object or a wrong object.

Alternatively, the first game processing means may display, on the display device, a game image representing the game. The result processing means may display, on the display device, a result of the determination as to whether the object selected by the object selection means is a correct object or a wrong object.

Thus, it is possible to realize a game in which one object is selected from among a plurality of objects according to the timing when the player wears the sensor, and the player competes for whether the selected object is a correct object or a wrong object.

Alternatively, the result processing means may display, when the sensor attachment determining means determines that the sensor has changed from the attached state to the detached state after the object selection means selects one of the plurality of objects, a result of the determination as to whether the object selected by the object selection means is a correct object or a wrong object, on the display device, in accordance with the timing at which the determination is made.

Thus, it is possible to realize a game in which one object is selected from among a plurality of objects according to the timing when the player wears the sensor, and whether the selected object is a correct object or a wrong object is clarified at the timing when the player removes the sensor.

Alternatively, the object selection means may successively change, in a predetermined cycle, an object selectable from the plurality of objects, and may select, as the one object, an object that is selectable at the timing when the sensor attachment determining means determines that the sensor has changed from the detached state to the attached state.

Thus, in the case where an object that is selectable from among a plurality of objects is successively changed in a predetermined cycle, an object that is selectable at the timing when the player wears the sensor is selected as one object. Therefore, it is possible to easily determine an object that is selectable by the player at the current time point.

Alternatively, the game program may further cause the computer to function as game selection means, first processing means, and second processing means. The game selection means selects one game from among a plurality of games in accordance with an operation performed by a player. The first processing means performs, when the game selection means selects a first game, a game processing corresponding to the first game by causing the computer to function as the biological signal obtaining means, the sensor attachment determining means, and the first game processing means. The second processing means performs, when the game selection means selects a second game, a processing different from the game processing corresponding to the first game. The second processing means may include biological parameter calculation means, and second game processing means. The biological parameter calculation means calculates a biological parameter of the player, based on a biological signal that is repeatedly obtained from the sensor. The second game processing means performs a game processing corresponding to the second game by using the biological parameter calculated by the biological parameter calculating means.

Thus, under a situation where a game processing using a biological parameter can be performed when the player selects the second game, it is possible to realize the first game with high responsiveness by using a biological signal for calculating the biological signal.

Alternatively, the game program may further cause the computer to function as biological parameter calculating means. The biological parameter calculating means calculates a biological parameter of the player, based on a biological signal that is repeatedly obtained from the sensor. The determination time setting means may change the first determination time in accordance with the biological parameter calculated by the biological parameter obtaining means.

Thus, it is possible to realize a game using a biological parameter of the player, and a biological signal used for calculating the biological parameter.

Alternatively, the sensor may detect a pulse wave of the player, and may output the pulse wave of the player as the biological signal. The sensor attachment determining means may determine whether the sensor is attached to the player, by determining a value itself of the pulse wave indicated by the biological signal.

Thus, it is possible to realize a highly-responsive game processing by using the value of the pulse wave of the player.

Alternatively, the sensor may include infrared light emitting section, and infrared light receiving section. The infrared light emitting section emits infrared light. The infrared light receiving section receives, when the sensor is attached to the player, the infrared light emitted from the infrared light emitting section via a part of the body of the player, and directly receives, when the sensor is not attached to the player, the infrared light emitted from the infrared light emission section and then outputs, as the biological signal, a photoelectric voltage according to the received light. The sensor attachment determination means may determine the value itself of the photoelectric voltage to determine whether the sensor is attached to the player.

Thus, it is possible to realize a highly-responsive game processing by using a photoelectric voltage representing an amount of infrared light that is received via a part of the player's body when the player wears the sensor.

Further, second to fourth aspects of the present invention may be implemented in the form of a game apparatus or a game system including the above respective means, or in the form of a game processing method including operations performed by the above respective means.

According to the present invention, a highly-responsive game processing is realized under a situation where a biological parameter is calculable based on a biological signal obtained from a player.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a perspective view illustrating an example of the core unit 70 of FIG. 3 in a state where an upper casing thereof is removed;

FIG. 15 is a flowchart showing an example of main processing performed on the game apparatus body 5;

DESCRIPTION OF THE PREFERRED EMBODIMENTS

Figure 1:
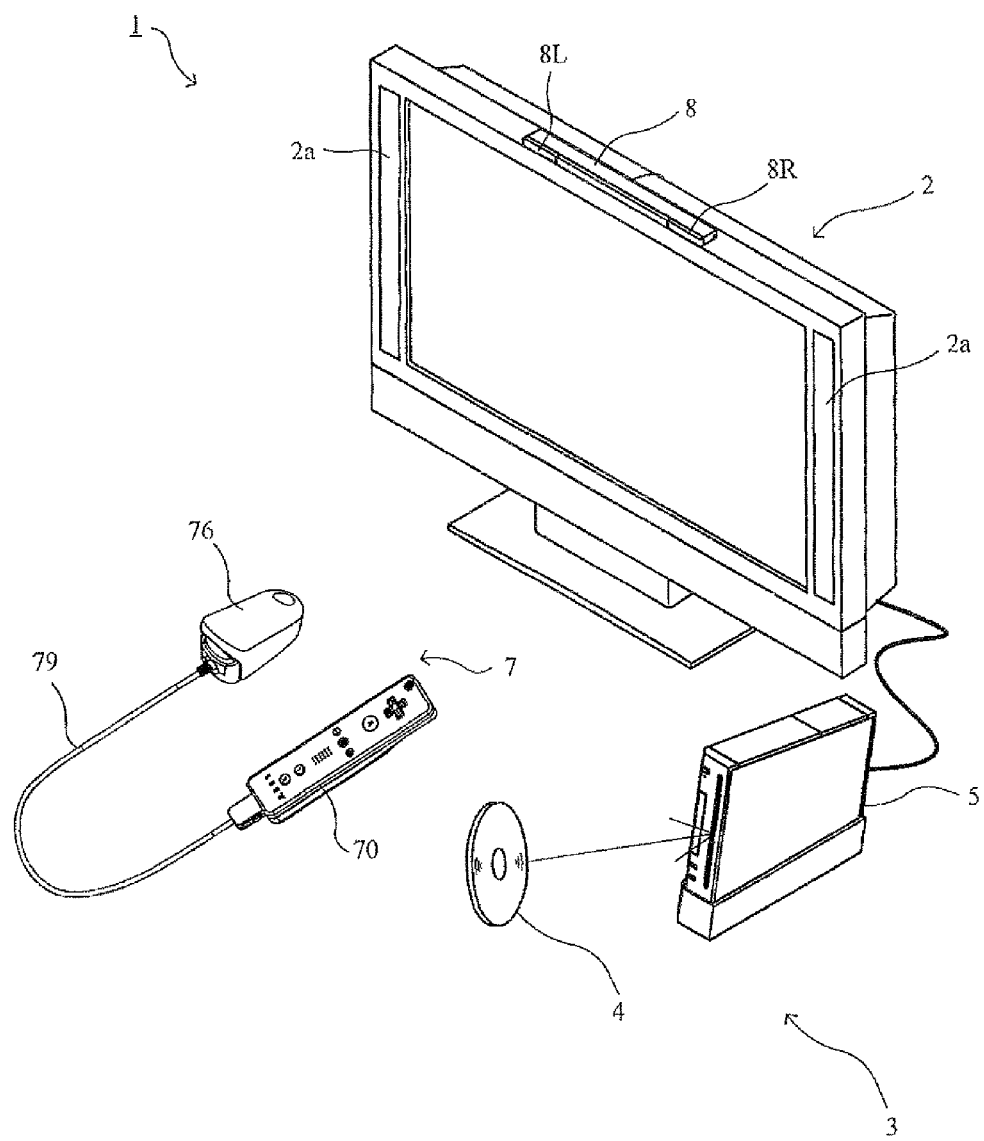
FIG. 1 is an external view showing an example of a game system 1 according to an embodiment of the present invention.
Figure 2:
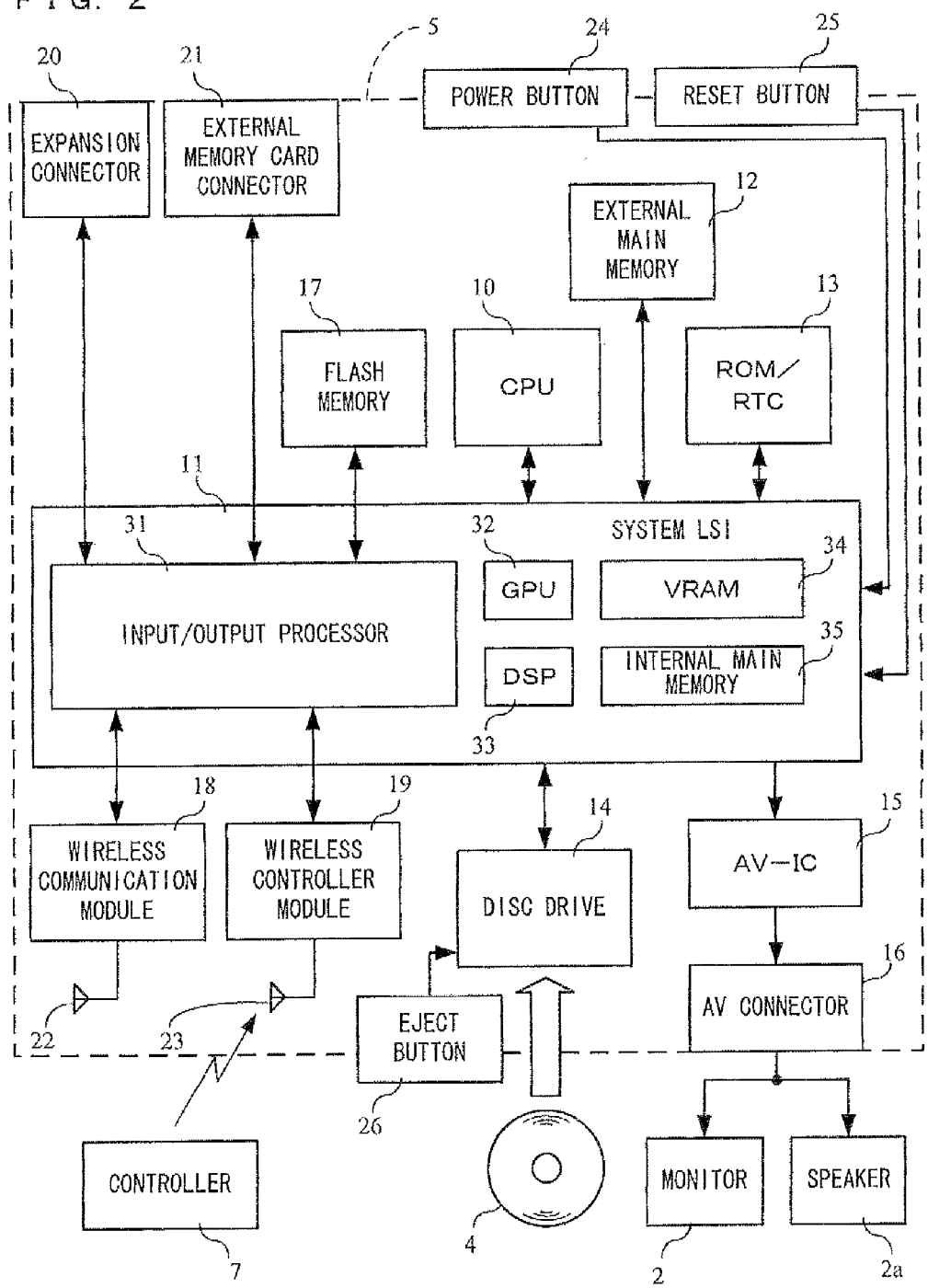
FIG. 2 is a block diagram showing an example of a game apparatus body 5 of FIG. 1.

With reference to FIG. 1, an apparatus for executing a game program according to one embodiment of the present invention will be described. Hereinafter, in order to give a specific explanation, a description will be given using a game system including a stationary game apparatus body 5 that is an example of the above apparatus. FIG. 1 is an external view showing an example of a game system 1 including a stationary game apparatus 3. FIG. 2 is a block diagram showing an example of the game apparatus body 5. The game system 1 will be described below.

As shown in FIG. 1, the game system 1 includes: a home-use television receiver 2 (hereinafter referred to as a monitor 2) that is an example of display means; and the stationary game apparatus 3 that is connected to the monitor 2 via a connection cord. The monitor 2 has loudspeakers 2a for outputting, in the form of sound, an audio signal outputted from the game apparatus 3. The game apparatus 3 includes: an optical disc 4 having the game program stored thereon; the game apparatus body 5 having a computer for executing the game program of the optical disc 4 to output and display a game screen on the monitor 2; and a controller 7 for providing the game apparatus body 5 with necessary operation information for a game in which a character or the like displayed in the game screen is controlled.

The game apparatus body 5 includes a wireless controller module 19 therein (see FIG. 2). The wireless controller module 19 receives data wirelessly transmitted from the controller 7, and transmits data from the game apparatus body 5 to the controller 7. In this manner, the controller 7 and the game apparatus body 5 are connected to each other by wireless communication. Further, the optical disc 4 as an example of an exchangeable information storage medium is detachably mounted on the game apparatus body 5.

On the game apparatus body 5, a flash memory 17 (see FIG. 2) is mounted. The flash memory 17 acts as a backup memory for fixedly storing such data as save data. The game apparatus body 5 executes the game program or the like stored in the optical disc 4, and displays a result thereof as a game image on the monitor 2. The game program to be executed may be prestored not only in the optical disc 4, but also in the flash memory 17. The game apparatus body 5 may reproduce a state of the game played in the past, by using the save data stored in the flash memory 17, and display an image of the reproduced game state on the monitor 2. A player of the game apparatus 3 can enjoy advancing in the game by operating the controller 7 while watching the game image displayed on the monitor 2.

By using the technology of, for example, Bluetooth (registered trademark), the controller 7 wirelessly transmits transmission data, such as operation information and biological information, to the game apparatus body 5 having the wireless controller module 19 therein. The controller 7 includes a core unit 70 and a vital sensor 76. The core unit 70 and the vital sensor 76 are connected to each other via a flexible connection cable 79. The core unit 70 is operation means mainly for controlling an object or the like displayed on a display screen of the monitor 2. The vital sensor 76 is attached to a player's body (e.g., to a player's finger). The vital sensor 76 obtains biological signals from the player, and sends the biological signals to the core unit 70 via the connection cable 79. The core unit 70 includes: a housing that is small enough to be held by one hand; and a plurality of operation buttons (including a cross key, a stick, or the like) that are exposed at a surface of the housing. As described later in detail, the core unit 70 includes an imaging information calculation section 74 for taking an image of a view viewed from the core unit 70. As an example of imaging targets of the imaging information calculation section 74, two LED modules 8L and 8R (hereinafter referred to as "markers 8L and 8R") are provided in the vicinity of the display screen of the monitor 2. These markers 8L and 8R each output, for example, infrared light forward from the monitor 2. The controller 7 (e.g., the core unit 70) is capable of receiving, via a communication section 75, transmission data wirelessly transmitted from the wireless controller module 19 of the game apparatus body 5, and generating a sound or vibration based on the transmission data.

Note that, in this embodiment, the core unit 70 and the vital sensor 76 are connected to each other via the flexible connection cable 79. However, the connection cable 79 can be eliminated by mounting a wireless unit on the vital sensor 76. For example, a Bluetooth (registered trademark) unit mounted on the vital sensor 76 as a wireless unit enables transmission of biological signals from the vital sensor 76 to the core unit 70 or to the game apparatus body 5 is enabled. Further, the core unit 70 and the vital sensor 76 may be integrated, by fixedly providing the vital sensor 76 on the core unit 70. In this case, the player can use the vital sensor 76 integrated with the core unit 70.

Next, an internal configuration of the game apparatus body 5 will be described with reference to FIG. 2. FIG. 2 is a block diagram showing the internal configuration of the game apparatus body 5. The game apparatus body 5 has a CPU (Central Processing Unit) 10, a system LSI (Large Scale Integration) 11, an external main memory 12, a ROM/RTC (Read Only Memory/Real Time Clock) 13, a disc drive 14, an AV-IC (Audio Video-Integrated Circuit) 15, and the like.

The CPU 10 performs game processing by executing the game program stored in the optical disc 4, and acts as a game processor. The CPU 10 is connected to the system LSI 11. In addition to the CPU 10, the external main memory 12, the ROM/RTC 13, the disc drive 14, and the AV-IC 15 are connected to the system LSI 11. The system LSI 11 performs processing such as: controlling data transfer among components connected to the system LSI 11; generating an image to be displayed; obtaining data from external devices; and the like. An internal configuration of the system LSI 11 will be described later. The external main memory 12 that is a volatile memory stores a program, for example, the game program loaded from the optical disc 4, or a game program loaded from the flash memory 17, and also stores various data. The external main memory 12 is used as a work area or buffer area of the CPU 10. The ROM/RTC 13 has a ROM (so-called a boot ROM) in which a boot program for the game apparatus body 5 is incorporated, and has a clock circuit (RTC) that counts the time. The disc drive 14 reads program data, texture data, and the like from the optical disc 4, and writes the read data into a later-described internal main memory 35 or into the external main memory 12.

On the system LSI 11, an input/output processor 31, a GPU (Graphic Processor Unit) 32, a DSP (Digital Signal Processor) 33, a VRAM (Video RAM) 34, and the internal main memory 35 are provided. Although not shown, these components 31 to 35 are connected to each other via an internal bus.

The GPU 32 is a part of rendering means, and generates an image in accordance with a graphics command from the CPU 10. The VRAM 34 stores necessary data (data such as polygon data, texture data and the like) for the GPU 32 to execute the graphics command. At the time of generating the image, the GPU 32 uses the data stored in the VRAM 34, thereby generating image data.

The DSP 33 acts as an audio processor, and generates audio data by using sound data and sound waveform (tone) data stored in the internal main memory 35 and in the external main memory 12.

The image data and the audio data generated in the above manner are read by the AV-IC 15. The AV-IC 15 outputs the read image data to the monitor 2 via the AV connector 16, and outputs the read audio data to the loudspeakers 2a embedded in the monitor 2. As a result, an image is displayed on the monitor 2 and a sound is outputted from the loudspeakers 2a.

The input/output processor (I/O Processor) 31 performs, for example, data transmission/reception to/from components connected thereto, and data downloading from external devices. The input/output processor 31 is connected to the flash memory 17, a wireless communication module 18, the wireless controller module 19, an expansion connector 20, and an external memory card connector 21. An antenna 22 is connected to the wireless communication module 18, and an antenna 23 is connected to the wireless controller module 19.

The input/output processor 31 is connected to a network via the wireless communication module 18 and the antenna 22 so as to be able to communicate with other game apparatuses and various servers connected to the network. The input/output processor 31 regularly accesses the flash memory 17 to detect presence or absence of data that is required to be transmitted to the network. If such data is present, the data is transmitted to the network via the wireless communication module 18 and the antenna 22. Also, the input/output processor 31 receives, via the network, the antenna 22 and the wireless communication module 18, data transmitted from other game apparatuses or data downloaded from a download server, and stores the received data in the flash memory 17. By executing the game program, the CPU 10 reads the data stored in the flash memory 17, and the game program uses the read data. In addition to the data transmitted and received between the game apparatus body 5 and other game apparatuses or various servers, the flash memory 17 may store save data (such as result data or progress data of the game) of a game that is played using the game apparatus body 5.

Further, the input/output processor 31 receives, via the antenna 23 and the wireless controller module 19, operation data or the like transmitted from the controller 7, and temporarily stores the operation data or the like in a buffer area of the internal main memory 35 or of the external main memory 12. Note that, similarly to the external main memory 12, the internal main memory 35 may store a program, for example, the game program loaded from the optical disc 4 or a game program loaded from the flash memory 17, and also store various data. The internal main memory 35 may be used as a work area or buffer area of the CPU 10.

In addition, the expansion connector 20 and the external memory card connector 21 are connected to the input/output processor 31. The expansion connector 20 is a connector for such interface as USB, SCSI or the like. The expansion connector 20, instead of the wireless communication module 18, is able to perform communication with a network by being connected to such a medium as an external storage medium, to such a peripheral device as another controller, or to a connector for wired communication. The external memory card connector 21 is a connector to be connected to an external storage medium such as a memory card. For example, the input/output processor 31 is able to access the external storage medium via the expansion connector 20 or the external memory card connector 21 to store or read data in/from the external storage medium.

On the game apparatus body 5 (e.g., on a front main surface thereof), a power button 24 of the game apparatus body 5, a reset button 25 for resetting game processing, an insertion slot for mounting the optical disc 4 in a detachable manner, an eject button 26 for ejecting the optical disc 4 from the insertion slot of the game apparatus body 5, and the like, are provided. The power button 24 and the reset button 25 are connected to the system LSI 11. When the power button 24 is turned on, each component of the game apparatus body 5 is supplied with power via an AC adaptor (not shown). When the reset button 25 is pressed, the system LSI 11 re-executes the boot program of the game apparatus body 5. The eject button 26 is connected to the disc drive 14. When the eject button 26 is pressed, the optical disc 4 is ejected from the disc drive 14.

Figure 3:
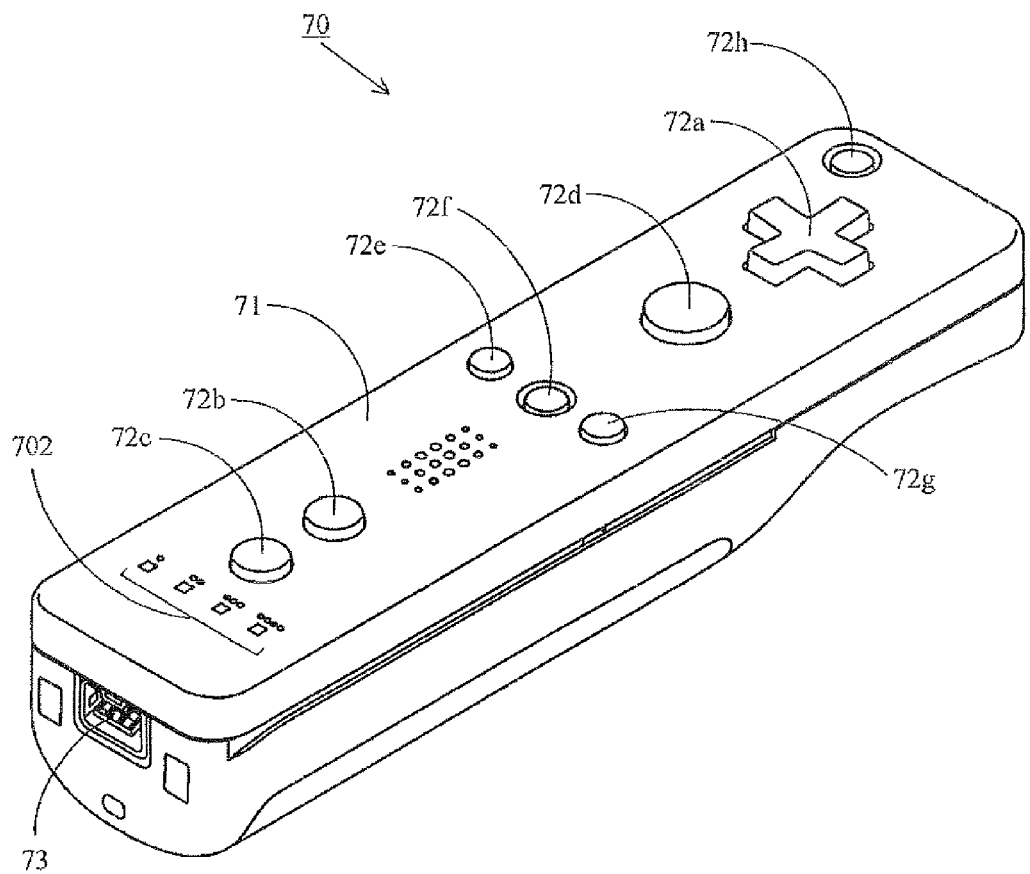
FIG. 3 is a perspective view of a core unit 70 of FIG. 1 as viewed from a top rear side thereof.
Figure 4:
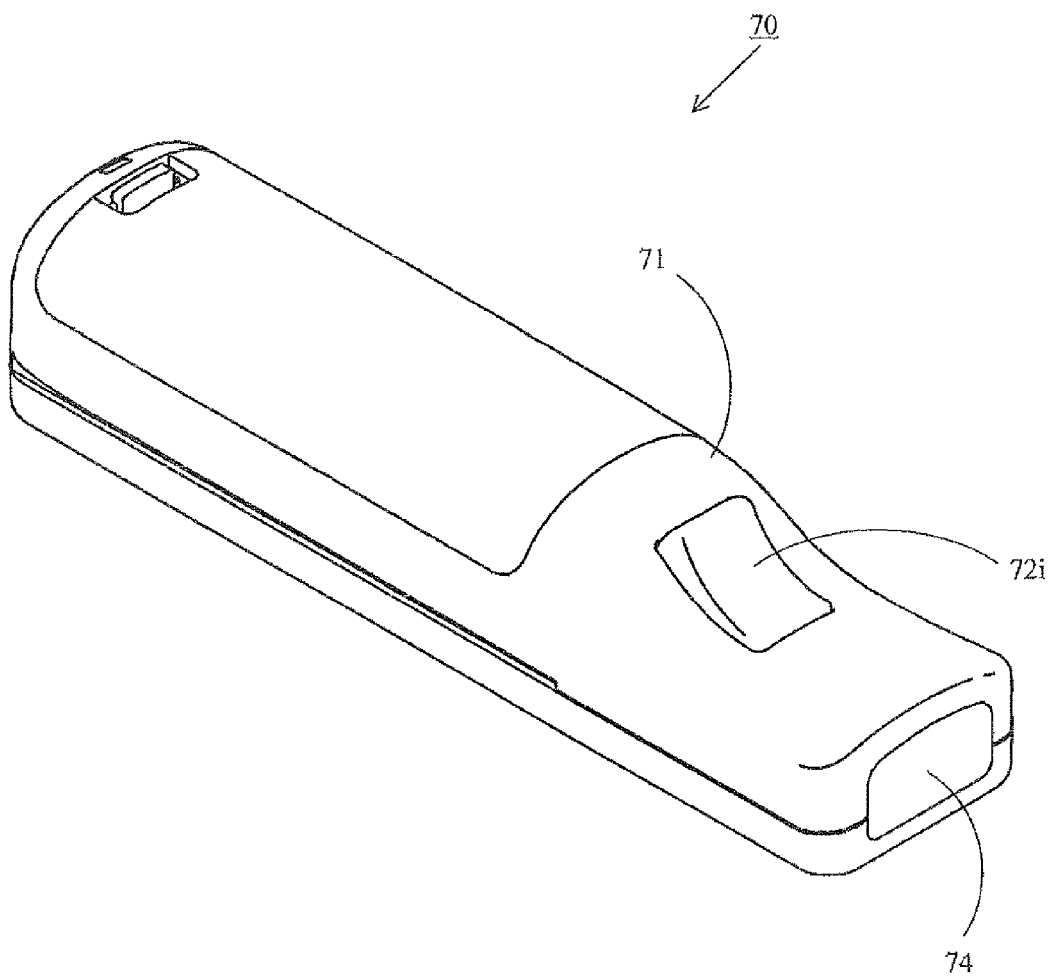
FIG. 4 is a perspective view of the core unit 70 of FIG. 3 as viewed from a bottom front side thereof.

With reference to FIGS. 3 and 4, the core unit 70 will be described. FIG. 3 is a perspective view of the core unit 70 viewed from a top rear side thereof. FIG. 4 is a perspective view of the core unit 70 viewed from a bottom front side thereof.

As shown in FIGS. 3 and 4, the core unit 70 includes a housing 71 formed by plastic molding or the like. The housing 71 has a plurality of operation sections 72 provided thereon. The housing 71 has an approximately parallelepiped shape extending in a longitudinal direction from front to rear. The overall size of the housing 71 is small enough to be held by one hand of an adult or even a child.

At the center of a front part of a top surface of the housing 71, a cross key 72a is provided. The cross key 72a is a cross-shaped four-direction push switch. The cross key 72a includes operation portions corresponding to four directions (front, rear, right, and left), which are respectively located on cross-shaped projecting portions arranged at intervals of 90 degrees. The player selects one of the front, rear, right and left directions by pressing one of the operation portions of the cross key 72a. Through an operation of the cross key 72a, the player can, for example, designate a direction in which a player character or the like appearing in a virtual game world is to move, or give an instruction to select one of multiple options.

The cross key 72a is an operation section for outputting an operation signal in accordance with the aforementioned direction input operation performed by the player. Such an operation section may be provided in a different form. For example, an operation section that has four push switches arranged in a cross formation and that is capable of outputting an operation signal in accordance with pressing of one of the push switches by the player, may be provided. Alternatively, an operation section that has a composite switch having, in addition to the above four push switches, a center switch provided at an intersection point of the above cross formation, may be provided. Still alternatively, the cross key 72a may be replaced with an operation section that includes an inclinable stick (so-called a joy stick) projecting from the top surface of the housing 71 and that outputs an operation signal in accordance with an inclining direction of the stick. Still alternatively, the cross key 72a may be replaced with an operation section that includes a horizontally-slidable disc-shaped member and that outputs an operation signal in accordance with a sliding direction of the disc-shaped member. Still alternatively, the cross key 72a may be replaced with a touch pad.

Behind the cross key 72a on the top surface of the housing 71, a plurality of operation buttons 72b to 72g are provided. The operation buttons 72b to 72g are each an operation section for, when the player presses a head thereof, outputting a corresponding operation signal. For example, functions as a 1st button, a 2nd button, and an A button are assigned to the operation buttons 72b to 72d. Also, functions as a minus button, a home button, and a plus button are assigned to the operation buttons 72e to 72g, for example. Operation functions are assigned to the respective operation buttons 72a to 72g in accordance with the game program executed by the game apparatus body 5. In the exemplary arrangement shown in FIG. 3, the operation buttons 72b to 72d are arranged in a line at the center on the top surface of the housing 71 in a front-rear direction. The operation buttons 72e to 72g are arranged on the top surface of the housing 71 in a line in a left-right direction between the operation buttons 72b and 72d. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for turning on and off the game apparatus body 5 by remote control. The operation button 72h also has a top surface thereof buried in the top surface of the housing 71, so as not to be inadvertently pressed by the player.

Behind the operation button 72c on the top surface of the housing 71, a plurality of LEDs 702 are provided. Here, a controller type (a number) is assigned to the core unit 70 such that the core unit 70 is distinguishable from other controllers. The LEDs 702 are used for, e.g., informing the player of the controller type currently set for the core unit 70. Specifically, a signal is transmitted from the wireless controller module 19 to the core unit 70 such that one of the plurality of LEDs 702, which corresponds to the controller type of the core unit 70, is lit up.

On the top surface of the housing 71, sound holes for outputting sounds from a later-described speaker (a speaker 706 shown in FIG. 5) to the external space are formed between the operation button 72b and the operation buttons 72e to 72g.

On the bottom surface of the housing 71, a recessed portion is formed. The recessed portion on the bottom surface of the housing 71 is formed in a position in which an index finger or middle finger of the player is located when the player holds the core unit 70 with one hand so as to point a front surface thereof to the markers 8L and 8R. On a slope surface of the recessed portion, an operation button 72i is provided. The operation button 72i is an operation section acting as, for example, a B button.

On the front surface of the housing 71, an image pickup element 743 that is a part of the imaging information calculation section 74 is provided. The imaging information calculation section 74 is a system for: analyzing image data of an image taken by the core unit 70; identifying an area having a high brightness in the image; and detecting the position of the center of gravity, the size, and the like of the area. The imaging information calculation section 74 has, for example, a maximum sampling period of approximately 200 frames/sec, and therefore can trace and analyze even a relatively fast motion of the core unit 70. A configuration of the imaging information calculation section 74 will be described later in detail. On the rear surface of the housing 71, a connector 73 is provided. The connector 73 is, for example, an edge connector, and is used for engaging and connecting the core unit 70 with a connection cable, for example.

Figure 6:
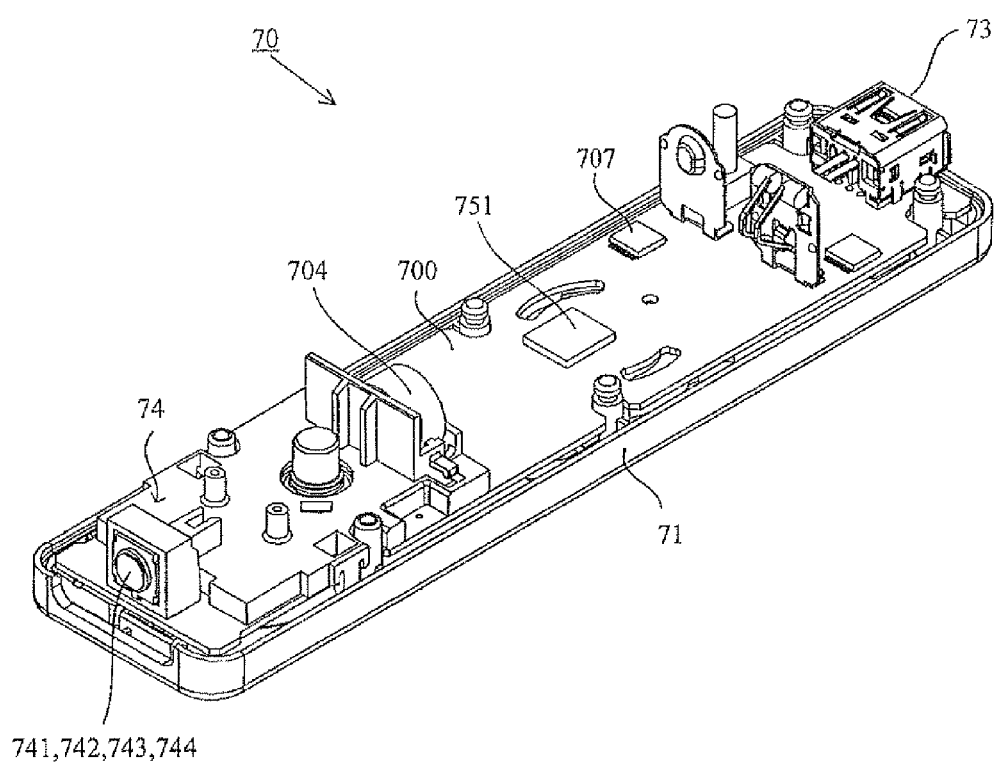
FIG. 6 is a perspective view illustrating an example of the core unit 70 of FIG. 4 in a state where a lower casing thereof is removed.

Next, an internal structure of the core unit 70 will be described with reference to FIGS. 5 and 6. FIG. 5 is a perspective view, viewed from a rear surface side of the core unit 70, of an example of the core unit 70 in a state where an upper casing thereof (a part of the housing 71) is removed. FIG. 6 is a perspective view, viewed from a front surface side of the core unit 70, of an example of the core unit 70 in a state where a lower casing thereof (a part of the housing 71) is removed. Here, FIG. 6 is a perspective view showing a reverse side of a substrate 700 shown in FIG. 5.

As shown in FIG. 5, the substrate 700 is fixedly provided inside the housing 71. On a top main surface of the substrate 700, the operation buttons 72a to 72h, an acceleration sensor 701, the LEDs 702, an antenna 754, and the like, are provided. These elements are connected to, for example, a microcomputer 751 (see FIGS. 6 and 7) via wiring (not shown) formed on the substrate 700 and the like. A wireless module 753 (see FIG. 7) and the antenna 754 allow the core unit 70 to act as a wireless controller. Inside the housing 71, a quartz oscillator (not shown) is provided, and the quartz oscillator generates a reference clock of the later-described microcomputer 751. Further, the speaker 706 and an amplifier 708 are provided on the top main surface of the substrate 700. The acceleration sensor 701 is provided, on the substrate 700, to the left side of the operation button 72d (i.e., provided not on a central part but on a peripheral part of the substrate 700). For this reason, in response to the core unit 70 having rotated around an axis of the longitudinal direction of the core unit 70, the acceleration sensor 701 is able to detect, in addition to a change in a direction of the gravitational acceleration, acceleration containing a centrifugal component, and the game apparatus body 5 or the like is able to determine, on the basis of detected acceleration data, a motion of the core unit 70 by predetermined calculation with favorable sensitivity.

As shown in FIG. 6, at a front edge of the bottom main surface of the substrate 700, the imaging information calculation section 74 is provided. The imaging information calculation section 74 includes an infrared filter 741, a lens 742, the image pickup element 743, and an image processing circuit 744, which are located in said order from the front surface of the core unit 70. These elements are attached to the bottom main surface of the substrate 700. At a rear edge of the bottom main surface of the substrate 700, the connector 73 is mounted. Further, a sound IC 707 and the microcomputer 751 are provided on the bottom main surface of the substrate 700. The sound IC 707 is connected to the microcomputer 751 and the amplifier 708 via wiring formed on the substrate 700 and the like, and outputs an audio signal via the amplifier 708 to the speaker 706 in response to sound data transmitted from the game apparatus body 5.

On the bottom main surface of the substrate 700, a vibrator 704 is attached. The vibrator 704 may be, for example, a vibration motor or a solenoid. The vibrator 704 is connected to the microcomputer 751 via wiring formed on the substrate 700 and the like, and is activated or deactivated in accordance with vibration data transmitted from the game apparatus body 5. The core unit 70 is vibrated by actuation of the vibrator 704, and the vibration is conveyed to the player's hand holding the core unit 70. Thus, a so-called vibration-feedback game is realized. Since the vibrator 704 is provided at a relatively forward position in the housing 71, the housing 71 held by the player significantly vibrates, and allows the player to easily feel the vibration.

Figure 7:
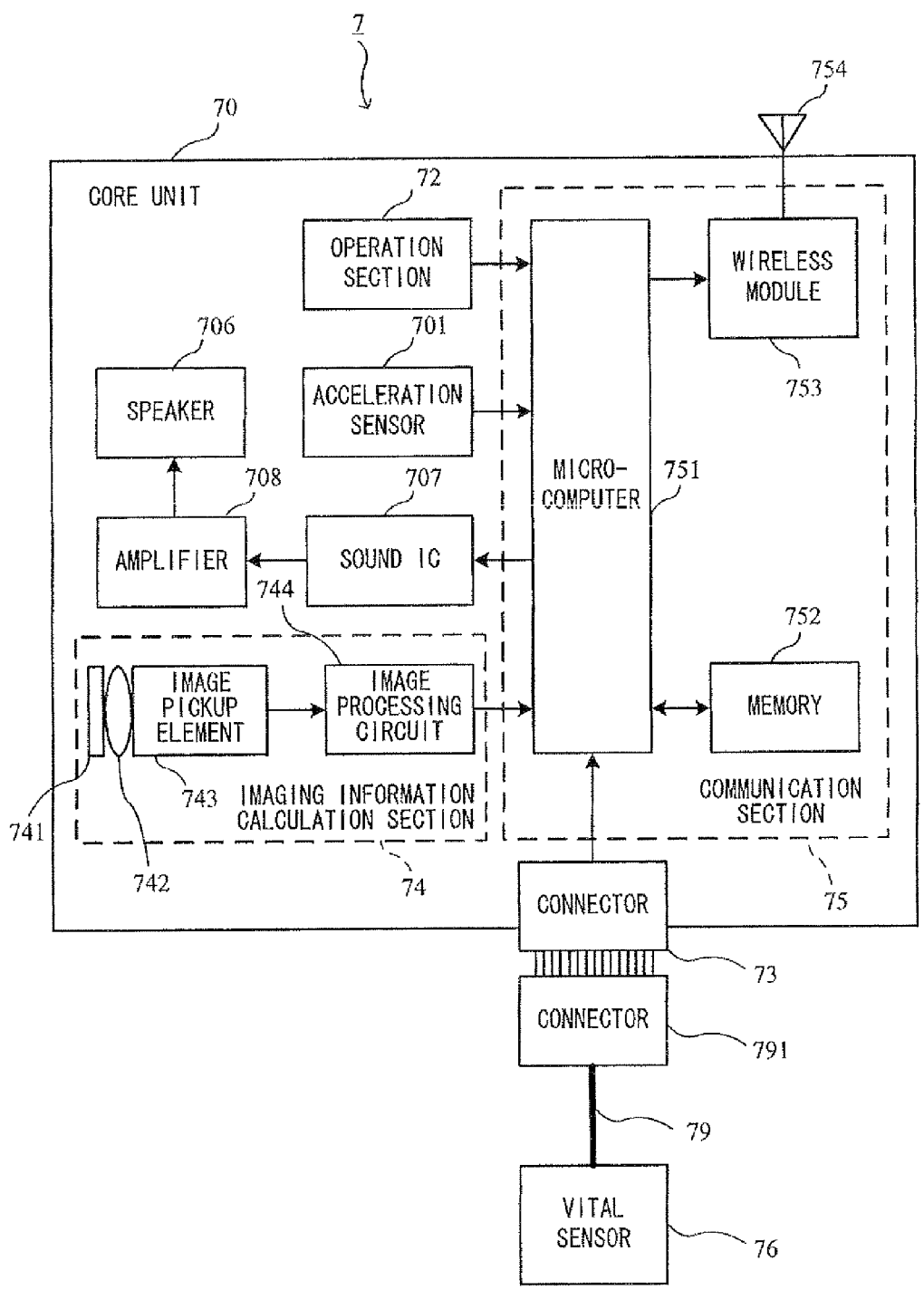
FIG. 7 is a block diagram showing an example of a configuration of the core unit 70 of FIG. 3.

Next, an internal configuration of the controller 7 will be described with reference to FIG. 7. FIG. 7 is a block diagram showing an example of the internal configuration of the controller 7.

As shown in FIG. 7, the core unit 70 includes the communication section 75 in addition to the above-described operation sections 72, the imaging information calculation section 74, the acceleration sensor 701, the vibrator 704, the speaker 706, the sound IC 707, and the amplifier 708. The vital sensor 76 is connected to the microcomputer 751 via the connection cable 79 and connectors 791 and 73.

The imaging information calculation section 74 includes the infrared filter 741, the lens 742, the image pickup element 743, and the image processing circuit 744. The infrared filter 741 allows, among light incident thereon through the front surface of the core unit 70, only infrared light to pass therethrough. The lens 742 condenses the infrared light having passed through the infrared filter 741, and outputs the condensed infrared light to the image pickup element 743. The image pickup element 743 is a solid-state image pickup element such as a CMOS sensor, CCD or the like. The image pickup element 743 takes an image of the infrared light condensed by the lens 742. In other words, the image pickup element 743 takes an image of only the infrared light having passed through the infrared filter 741. Then, the image pickup element 743 generates image data of the image. The image data generated by the image pickup element 743 is processed by the image processing circuit 744. Specifically, the image processing circuit 744 processes the image data obtained from the image pickup element 743, and detects a high brightness area of the image, and outputs, to the communication section 75, process result data indicative of results of detecting, for example, position coordinates, a square measure, and the like of the high brightness area. The imaging information calculation section 74 is fixed to the housing 71 of the core unit 70. An imaging direction of the imaging information calculation section 74 can be changed by changing a facing direction of the housing 71.

The process result data outputted from the imaging information calculation section 74 can be used as operation data indicative of: a position designated by using the core unit 70; and the like. For example, the player holds the core unit 70 such that the front surface of the core unit 70 (a side having a light opening through which light is incident on the imaging information calculation section 74 taking an image of the light) faces the monitor 2. On the other hand, the two markers 8L and 8R are provided in the vicinity of the display screen of the monitor 2. The markers 8L and 8R each emit infrared light forward from the monitor 2, and become imaging targets of the imaging information calculation section 74. Then, the game apparatus body 5 calculates a position designated by the core unit 70, by using position data regarding high brightness points based on the two makers 8L and 8R.

For example, when the player holds the core unit 70 such that its front surface faces the monitor 2, the infrared lights outputted from the two markers 8L and 8R are incident on the imaging information calculation section 74. The image pickup element 743 takes images of the incident infrared lights via the infrared filter 741 and the lens 742, and the image processing circuit 744 processes the taken images. In the imaging information calculation section 74, components of the infrared lights outputted from the markers 8L and 8R are detected, whereby positional information (positions of target images) and the like of the markers 8L and 8R on the taken image are obtained. Specifically, the image processing circuit 744 analyzes the image data taken by the image pickup element 743, eliminates, from area information of the taken image, images that are not generated by the infrared lights outputted from the markers 8L and 8R, and then determines the high brightness points as the positions of the markers 8L and 8R. The imaging information calculation section 74 obtains the positional information such as positions of the centers of gravity of the determined high brightness points, and outputs the positional information as the process result data. The positional information, which is the process result data, may be outputted as coordinate values whose origin point is set to a predetermined reference point on a taken image (e.g., the center or the left top corner of the taken image). Alternatively, with the position of the center of gravity at a predetermined timing being set as a reference point, the difference between the reference point and a current position of the center of gravity may be outputted as a vector. That is, in the case where a predetermined reference point is set on the taken image taken by the image pickup element 743, the positional information on the target images is used as parameters representing differences between the positions of the target images and the reference point position. The positional information is transmitted to the game apparatus body 5, whereby, on the basis of the differences between the reference point and the positional information, the game apparatus body 5 is capable of obtaining variations in a signal that corresponds to a movement, an attitude, a position, and the like of the imaging information calculation section 74, i.e., the core unit 70, with respect to the markers 8L and 8R. Specifically, when the core unit 70 is moved, the positions of the centers of gravity of the high brightness points in the image transmitted from the communication section 75 change. Therefore, a direction and a coordinate point are inputted in accordance with the change in the positions of the centers of gravity of the high brightness points, whereby the position designated by the core unit 70 may be regarded as an operation input, and a direction and a coordinate point may be inputted in accordance with a direction in which the core unit 70 moves.

In this manner, the imaging information calculation section 74 of the controller 7 takes the images of the markers (the infrared lights from the markers 8L and 8R in this embodiment) that are located fixedly, whereby data outputted from the controller 7 is processed in the process on the game apparatus body 5, and an operation can be performed in accordance with the movement, the attitude, the position, and the like of the core unit 70. Further, it becomes possible to perform an intuitive operation input that is different from an input performed by pressing an operation button or an operation key. Since the above markers are located in the vicinity of the display screen of the monitor 2, a position of the core unit 70 with respect to the markers can be easily converted to the movement, the attitude, position and the like of the core unit 70 with respect to the display screen of the monitor 2. That is, the process result data based on the movement, the attitude, the position, and the like of the core unit 70 is used as an operation input directly reflected on the display screen of the monitor 2 (e.g., an input of the position designated by the core unit 70), and thus the core unit 70 can be caused to serve as a pointing device with respect to the display screen.

Preferably, the core unit 70 includes a triaxial acceleration sensor 701. The triaxial acceleration sensor 701 detects linear acceleration in three directions, i.e., the up-down direction, the left-right direction, and the front-rear direction. Alternatively, an accelerometer capable of detecting linear acceleration along at least one axis direction may be used. As a non-limiting example, the acceleration sensor 701 may be of the type available from Analog Devices, Inc. or STMicroelectronics N.V. Preferably, the acceleration sensor 701 is an electrostatic capacitance or capacitance-coupling type that is based on silicon micro-machined MEMS (microelectromechanical systems) technology. However, any other suitable accelerometer technology (e.g., piezoelectric type or piezoresistance type) now existing or later developed may be used to provide the acceleration sensor 701.

Accelerometers, as used in the acceleration sensor 701, are only capable of detecting acceleration along a straight line (linear acceleration) corresponding to each axis of the acceleration sensor 701. In other words, the direct output of the acceleration sensor 701 is limited to signals indicative of linear acceleration (static or dynamic) along each of the three axes thereof. As a result, the acceleration sensor 701 cannot directly detect movement along a non-linear (e.g., arcuate) path, rotation, rotational movement, angular displacement, inclination, position, orientation or any other physical characteristic. However, through processing by a computer such as a processor of the game apparatus (e.g., the CPU 10) or a processor of the controller (e.g., the microcomputer 751) based on the acceleration signals outputted from the acceleration sensor 701, additional information relating to the core unit 70 can be inferred or calculated (determined), as one skilled in the art will readily understand from the description herein.

The communication section 75 includes the microcomputer 751, a memory 752, the wireless module 753, and the antenna 754. The microcomputer 751 controls the wireless module 753 that wirelessly transmits transmission data, while using the memory 752 as a storage area during processing. The microcomputer 751 also controls operations of the sound IC 707 and the vibrator 704 (not shown) in accordance with data which the wireless module 753 has received from the game apparatus body 5 via the antenna 754. The sound IC 707 processes sound data or the like that is transmitted from the game apparatus body 5 via the communication section 75. Further, the microcomputer 751 activates the vibrator 704 in accordance with vibration data or the like (e.g., a signal for causing the vibrator 704 to be ON or OFF) that is transmitted from the game apparatus body 5 via the communication section 75.

Operation signals from the operation sections 72 provided on the core unit 70 (key data), acceleration signals from the acceleration sensor 701 with respect to the three axial directions (X-, Y- and Z-axis direction acceleration data), and the process result data from the imaging information calculation section 74, are outputted to the microcomputer 751. Also, biological signals (biological signal data) provided from the vital sensor 76 are outputted to the microcomputer 751 via the connection cable 79. The microcomputer 751 temporarily stores inputted data (the key data, the X-, Y- and Z-axis direction acceleration data, the process result data, and the biological signal data) in the memory 752 as transmission data to be transmitted to the wireless controller module 19. Here, wireless transmission from the communication section 75 to the wireless controller module 19 is performed at predetermined time intervals. Since game processing is generally performed at a cycle of 1/60 sec, the wireless transmission needs to be performed at a shorter cycle. Specifically, game processing is performed at a cycle of 16.7 ms (1/60 sec), and a transmission interval of the communication section 75 configured using the Bluetooth (registered trademark) technology is 5 ms. At a timing of performing transmission to the wireless controller module 19, the microcomputer 751 outputs, to the wireless module 753, the transmission data stored in the memory 752 as a series of pieces of operation information. The wireless module 753 uses, for example, the Bluetooth (registered trademark) technology to radiate, using a carrier wave having a predetermined frequency, a radio signal from the antenna 754, the radio signal indicative of the series of pieces of operation information. Thus, the key data from the operation sections 72 provided on the core unit 70, the X-, Y- and Z-axis direction acceleration data from the acceleration sensor 701, the process result data from the imaging information calculation section 74, and the biological information data from the vital sensor 76, are transmitted from the core unit 70. The wireless controller module 19 of the game apparatus body 5 receives the radio signal, and the game apparatus body 5 demodulates or decodes the radio signal to obtain the series of pieces of operation information (the key data, the X-, Y- and Z-axis direction acceleration data, the process result data, and the biological signal data). In accordance with the series of pieces of obtained operation information and the game program, the CPU 10 of the game apparatus body 5 performs game processing. In the case where the communication section 75 is configured using the Bluetooth (registered trademark) technology, the communication section 75 can have a function of receiving transmission data wirelessly transmitted from other devices.

Figure 8:
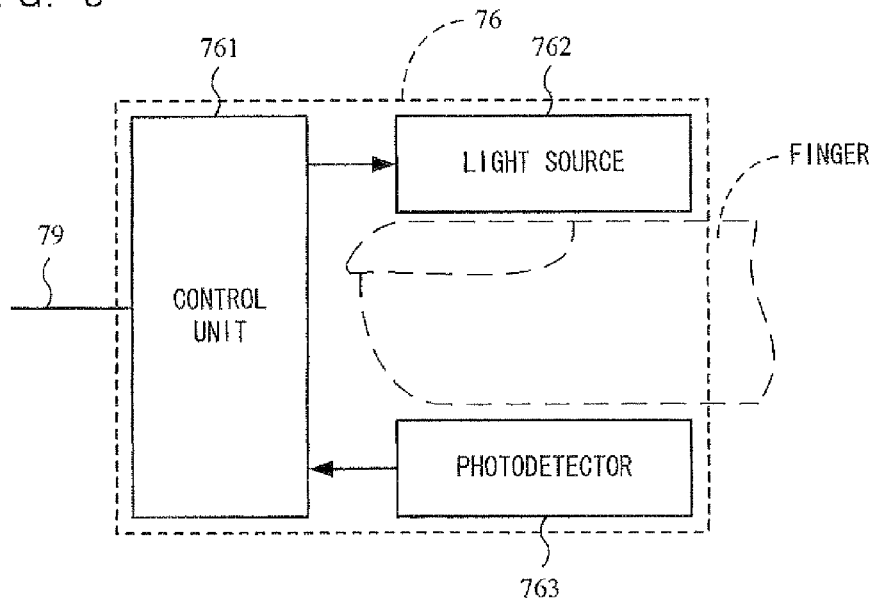
FIG. 8 is a block diagram showing an example of a configuration of a vital sensor 76.
Figure 9A:
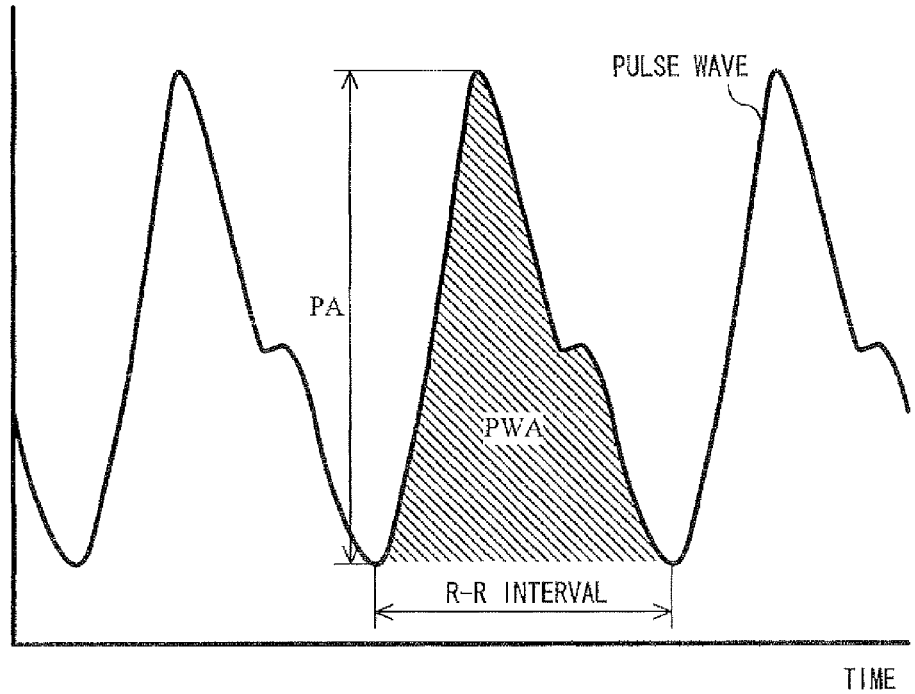
FIG. 9A is a diagram showing an example of a pulse wave signal that is an example of a biological signal outputted from the vital sensor 76.
Figure 9B:
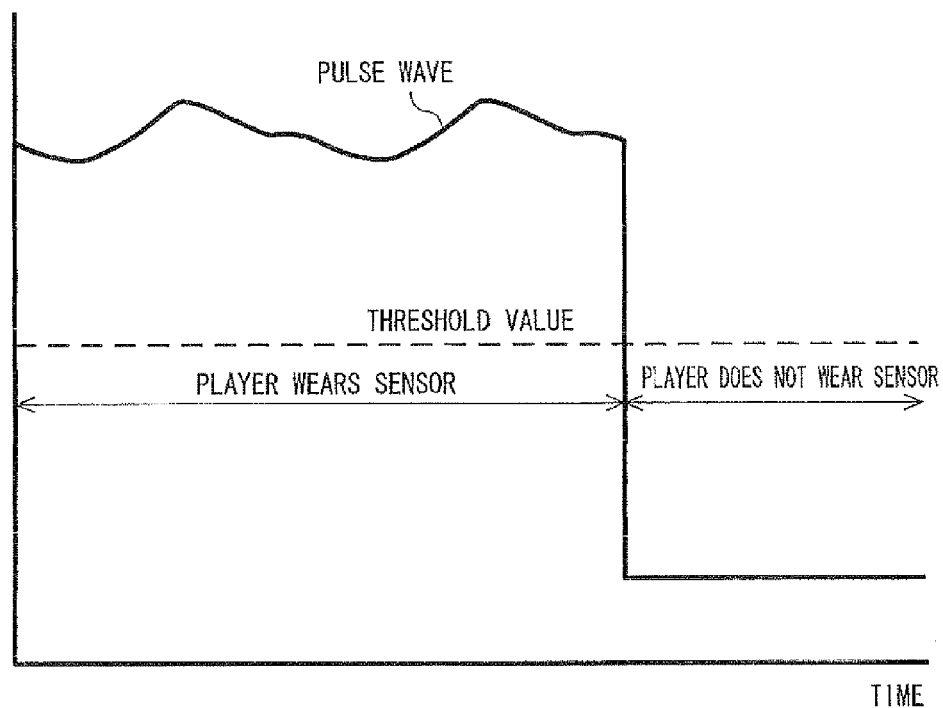
FIG. 9B is a diagram showing an example of a pulse wave signal that is an example of a biological signal outputted from the vital sensor 76.

Next, the vital sensor 76 will be described with reference to FIGS. 8 and 9. FIG. 8 is a block diagram showing an example of a configuration of the vital sensor 76. FIGS. 9A and 9B are diagrams showing a pulse wave signal that is an example of a biological signal outputted from the vital sensor 76. FIG. 9A showing the pulse wave signal is a graph in which the scale of values detected by a photodetector (i.e., a vertical axis) in a pulse wave portion of the pulse wave signal shown in FIG. 9B is expanded.

In FIG. 8, the vital sensor 76 includes a control unit 761, a light source 762, and a photodetector 763.

The light source 762 and the photodetector 763 constitutes a transmission-type digital-plethysmography sensor, which is an example of a sensor that obtains a biological signal of the player. The light source 762 includes, for example, an infrared LED that emits infrared light having a predetermined wavelength (e.g., 940 nm) toward the photodetector 763. On the other hand, the photodetector 763 senses the light emitted by the light source 762, in accordance with the wavelength of the emitted light. The photodetector 763 is constituted by, for example, an infrared photoresistor. The light source 762 and the photodetector 763 are arranged so as to face each other with a predetermined gap (hollow space).

Here, hemoglobin that exists in human blood absorbs infrared light. For example, a part (e.g., a fingertip) of the player's body is inserted in the gap between the light source 762 and the photodetector 763. In this case, the infrared light emitted from the light source 762 is partially absorbed by hemoglobin existing in the inserted fingertip before being sensed by the photodetector 763. On the other hand, arteries in the human body pulsate, and therefore, the thickness (blood flow rate) of the arteries varies depending on the pulsation. Therefore, similar pulsation occurs in arteries in the inserted fingertip, and the blood flow rate varies depending on the pulsation, so that the amount of infrared light absorption also varies depending on the blood flow rate. Specifically, as the blood flow rate in the inserted fingertip increases, the amount of light absorbed by hemoglobin also increases and therefore the amount of infrared light sensed by the photodetector 763 relatively decreases. Conversely, as the blood flow rate in the inserted fingertip decreases, the amount of light absorbed by hemoglobin also decreases and therefore the amount of infrared light sensed by the photodetector 763 relatively increases. The light source 762 and the photodetector 763 utilize such an operating principle, i.e., convert the amount of infrared light sensed by the photodetector 763 into a photoelectric signal to detect pulsation (hereinafter referred to as a pulse wave) of the human body. For example, as shown in FIG. 9A, when the blood flow rate in the inserted fingertip increases, the detected value of the photodetector 763 (e.g., a photoelectric voltage obtained when the photodetector 763 receives the light) increases, and when the blood flow rate in the inserted fingertip decreases, the detected value of the photodetector 763 decreases. Thus, a pulse wave portion in which the detected value of the photodetector 763 rises and falls is generated as a pulse wave signal. Depending on the circuit configuration of the photodetector 763, a pulse wave signal may be generated in which, when the blood flow rate in the inserted fingertip increases, the detected value of the photodetector 763 decreases, and when the blood flow rate in the inserted fingertip decreases, the detected value of the photodetector 763 increases.

When the player's fingertip or the like is not inserted in the gap between the light source 762 and the photodetector 763, the infrared light emitted from the light source 762 is directly received by the photodetector 763 with no intervening object. Therefore, in this case, the amount of infrared light received by the photodetector 763 significantly increases as compared with the case where the player's fingertip or the like is inserted in the gap between the light source 762 and the photodetector 763. For example, as shown in FIG. 9B, when the state where the player wears the vital sensor 76 at his/her finger and thereby his/her fingertip is inserted in the gap between the light source 762 and the photodetector 763 (sensor attached state shown in FIG. 9B) is changed to the state where the player removes the finger from the vital sensor 76 and thereby the fingertip is not inserted in the gap between the light source 762 and the photodetector 763 (sensor detached state shown in FIG. 9B), the amount of infrared light received by the photodetector 763 rapidly increases. In the example shown in FIGS. 9A and 9B, the circuit of the photodetector 763 is configured such that the detected value of the photodetector 763 increases when the blood flow rate in the inserted fingertip increases, and decreases when the blood flow rate in the inserted fingertip decreases. As shown in FIG. 9B, the decrease in the detected value of the photodetector 763, which is caused by the change from the sensor attached state to the sensor detached state, is several orders of magnitude greater than the increase/decrease of the detected value, which is caused by the increase/decrease of the blood flow rate in the inserted fingertip. Likewise, the increase in the detected value of the photodetector 763, which is caused by the change from the sensor detached state to the sensor attached state, is also several orders of magnitude greater than the increase/decrease of the detected value, which is caused by the increase/decrease of the blood flow rate in the inserted fingertip.

Accordingly, by providing a threshold value between the detected value of the photodetector 763 assuming the sensor detached state and the detected value of the photodetector 763 assuming the sensor attached state, it is possible to detect whether the player inserts a finger in the vital sensor 76, i.e., whether the player wears the vital sensor 76. For example, when the circuit of the photodetector 763 is configured such that the detected value of the photodetector 763 increases when the blood flow rate in the inserted fingertip increases, and the detected value of the photodetector 763 decreases when the blood flow rate in the inserted fingertip decreases, it is determined that the player wears the vital sensor 76 if the detected value of the photodetector 763 is equal to or greater than the threshold value, and that the player does not wear the vital sensor 76 when the detected value of the photodetector 763 is smaller than the threshold value. Further, when the circuit of the photodetector 763 is configured such that the detected value of the photodetector 763 decreases when the blood flow rate in the inserted fingertip increases, and the detected value of the photodetector 763 increases when the blood flow rate in the inserted fingertip decreases, it is determined that the player does not wear the vital sensor 76 if the detected value of the photodetector 763 is equal to or greater than the threshold value, and that the player wears the vital sensor 76 when the detected value of the photodetector 763 is smaller than the threshold value. Adopted in the following description is the former case, that is, the case where the circuit of the photodetector 763 is configured such that the detected value of the photodetector 763 increases when the blood flow rate in the inserted fingertip increases, and the detected value of the photodetector 763 decreases when the blood flow rate in the inserted fingertip decreases.

In the above example, whether the player wears the vital sensor 76 is determined depending on whether or not the detected value of the photodetector 763 is equal to or greater than the predetermined threshold value. However, another determination method may be adopted. For example, in a case where the detected value of the photodetector 763 is within a predetermined range when the player wears the vital sensor 76, and is outside the range when the player does not wear the vital sensor 76, it is possible to determine, by using this range, whether the player wears the vital sensor 76. Specifically, it is determined that the player wears the vital sensor 76 when the detected value of the photodetector 763 is within the range, and it is determined that the player does not wear the vital sensor 76 when the detected value of the photodetector 763 is larger than or smaller than the values in the range. Of course, also in a case where the detected value of the photodetector 763 is outside the predetermined range when the player wears the vital sensor 76, and is within the range when the player does not wear the vital sensor 76, it is possible to determine, by using this range, whether the player wears the vital sensor 76. Specifically, it is determined that the player does not wear the vital sensor 76 when the detected value of the photodetector 763 is within the range, and that the player wears the vital sensor 76 when the detected value of the photodetector 763 is greater than or smaller than the values in the range.

As another example, whether the player wears the vital sensor 76 may be detected depending on the amount of change in the detected value of the photodetector 763. As described above, the amount of change in the detected value of the photodetector 763, which is caused by the change from the sensor detached state to the sensor attached state, is several orders of magnitude greater than the amount of change in the detected value, which is caused by the increase/decrease in the blood flow rate in the inserted fingertip. Accordingly, when the amount of change in the detected value of the photodetector 763 is equal to or greater than a predetermined threshold value, it is determined that the sensor detached state changes to the sensor attached state, or the sensor attached state changes to the sensor detached state. On the other hand, when the amount of change in the detected value of the photodetector 763 is smaller than the threshold value, it is determined that the player remains in the sensor attached state or in the sensor detached state. By estimating that the player wears or does not wear the vital sensor 76 at a certain time point, and determining an amount of change in the detected value of the photodetector 763 on and after this time point, it is possible to detect whether the player wears the vital sensor 76. For example, the estimation as to whether the player wears the vital sensor 76 at a certain time point may include: estimating that the player does not wear the vital sensor 76 in the initial state of the vital sensor 76; or estimating a switching between the sensor attached state and the sensor detached state in accordance with that the player is instructed to wear or remove the vital sensor 76.

The control unit 761 is constituted by, for example, an MCU (Micro Controller Unit). The control unit 761 controls the amount of infrared light emitted from the light source 762. The control unit 761 A/D-converts a photoelectric signal (pulse wave signal) outputted from the photodetector 763 to generate pulse wave data (biological signal data). Then, the control unit 761 outputs the pulse wave data (biological signal data) to the core unit 70 via the connection cable 79.

In the game apparatus body 5, a biological signal of the player using the vital sensor 76 is detected by analyzing the pulse wave data obtained from the vital sensor 76, and thus various biological parameters of the player can be detected or calculated. The game apparatus body 5 may detect, as an example of a first biological parameter, a pulse timing of the player (e.g., a timing of heart contraction; exactly, a timing at which blood vessels in a part of the player's body to which the vital sensor 76 is attached contract or expand) in accordance with rising and falling of the pulse wave indicated by the pulse wave data obtained from the vital sensor 76. Specifically, the game apparatus body 5 may detect, as a pulse timing of the player, a timing at which the pulse wave indicated by the pulse wave data obtained from the vital sensor 76 represents a local minimum value; a timing at which the pulse wave represents a local maximum value; a timing at which a blood vessel contraction rate reaches a maximum value; a timing at which a blood vessel expansion rate reaches a maximum value; a timing at which acceleration of the blood vessel expansion rate reaches a maximum value; or a timing at which deceleration of the blood vessel expansion rate reaches a maximum value. When the game apparatus body 5 detects, as a pulse timing of the player, a timing at which acceleration of the blood vessel expansion rate reaches a maximum value or a timing at which deceleration of the blood vessel expansion rate reaches a maximum value, the game apparatus body 5 may detect, as a pulse timing of the player, a parameter obtained by differentiating the blood vessel expansion or contraction rate, i.e., a timing at which acceleration of blood vessel expansion reaches its maximum value or acceleration of blood vessel contraction reaches its maximum value.

As an example of a second biological parameter, a heart rate HR of the player may be calculated based on the player's pulse timing detected from the pulse wave represented by the pulse wave data. For example, a value obtained by dividing 60 seconds by the interval of pulse timings is calculated as the heart rate HR of the player using the vital sensor 76. Specifically, when the timing at which the pulse wave represents the local minimum value is set as the pulse timing, 60 seconds is divided by the interval of heartbeats between adjoining two local minimum values (an R-R interval shown in FIG. 9A), whereby the heart rate HR is calculated.

As an example of a third biological parameter, a respiratory cycle of the player may be calculated based on a rise-fall cycle of the heart rate HR. Specifically, when the heart rate HR calculated in this embodiment is rising, it is determined that the player is breathing in, and when the heart rate HR is falling, it is determined that the player is breathing out. That is, it is possible to calculate the cycle of breathing (respiratory cycle) of the player by calculating the rise-fall cycle (fluctuation cycle) of the heart rate HR.

As an example of a fourth biological parameter, the degree of easiness and difficulties felt by the player may be calculated based on an amplitude PA (e.g., a difference in height between a local maximum value of the pulse wave and a succeeding local minimum value; see FIG. 9A) of the pulse wave represented by the pulse wave data obtained from the vital sensor 76. Specifically, when the amplitude PA of the pulse wave is decreased, it can be determined that the player is in a difficult state.

As an example of a fifth biological parameter, a blood flow rate of the player can be obtained by dividing, by the heart rate HR, a pulse wave area PWA (see FIG. 9A) obtained from the pulse wave signal.

As an example of a sixth biological parameter, a coefficient of variance of R-R interval (CVRR) of the player may be calculated based on the interval of pulse timings (the interval of heartbeats; e.g., an R-R interval shown in FIG. 9A) of the player, which is detected from the pulse wave represented by the pulse wave data. For example, the CVRR is calculated by using the interval of heartbeats based on the past 100 beats indicated by the pulse wave obtained from the vital sensor 76. Specifically, the following equation is applied for calculation.

CVRR={(standard deviation of the interval of 100 heartbeats)/(average value of the interval of 100 heartbeats)}×100

With the use of the CVRR, it is possible to calculate the state of the autonomic nerve (e.g., the activity of the parasympathetic nerve) of the player.

An overview of game processing performed on the game apparatus body 5 will be described with reference to FIGS. 10 to 13 before a specific description of processes performed by the game apparatus body 5 is given. FIGS. 10 to 13 are diagrams each showing an example of a game image displayed on the monitor 2.

Figure 10:
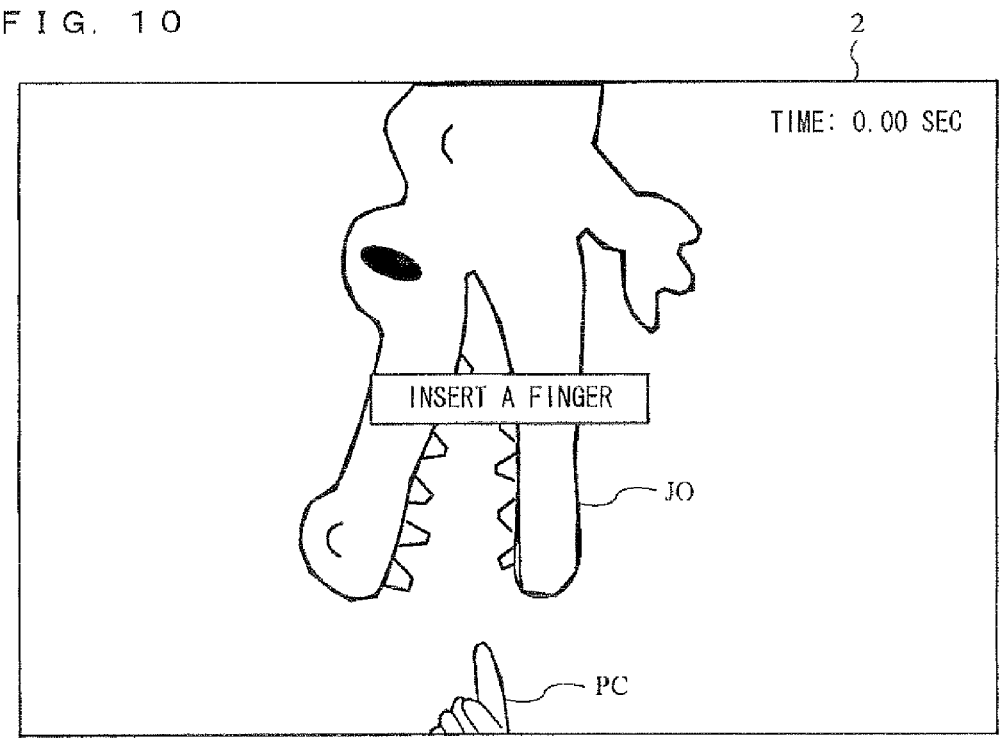
FIG. 10 is a diagram showing an example of a game image displayed on a monitor 2.

In FIG. 10, the monitor 2 represents a virtual game world in which a player character PC and a determination object JO are arranged. In the example of FIG. 10, an image that simulates a human hand with its index finger pointing upward is shown as the player character PC, and a crocodile with its mouth open is shown as the determination object JO. Textual information "INSERT A FINGER" that prompts the player to insert a finger in the gap in the vital sensor 76 is displayed on the monitor 2.

Figure 11:
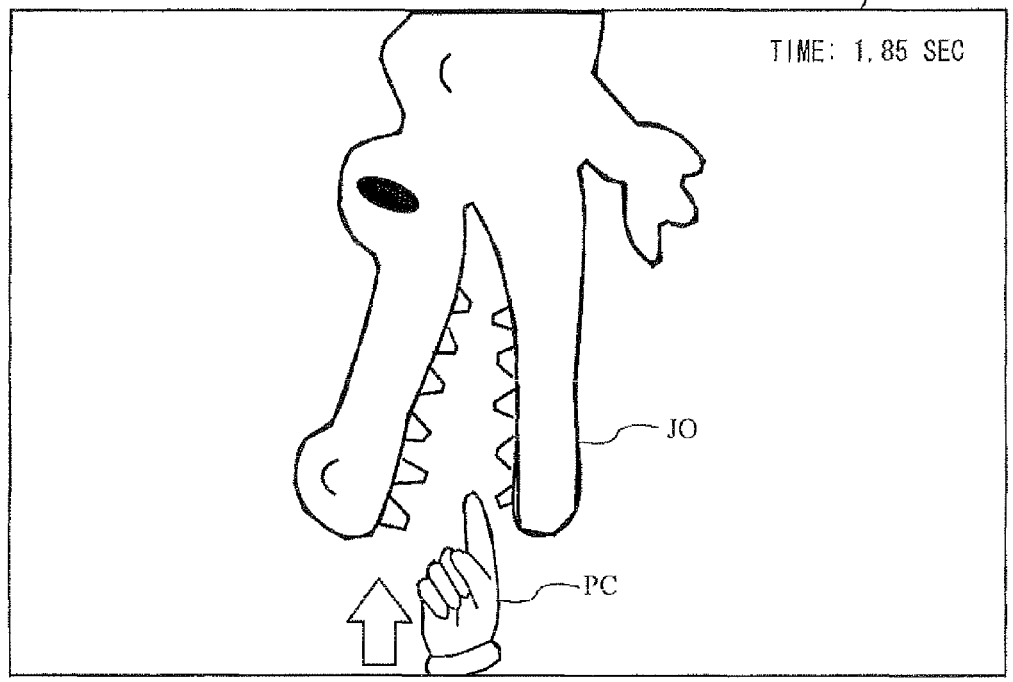
FIG. 11 is a diagram showing an example of the game image displayed on the monitor 2.
Figure 12:
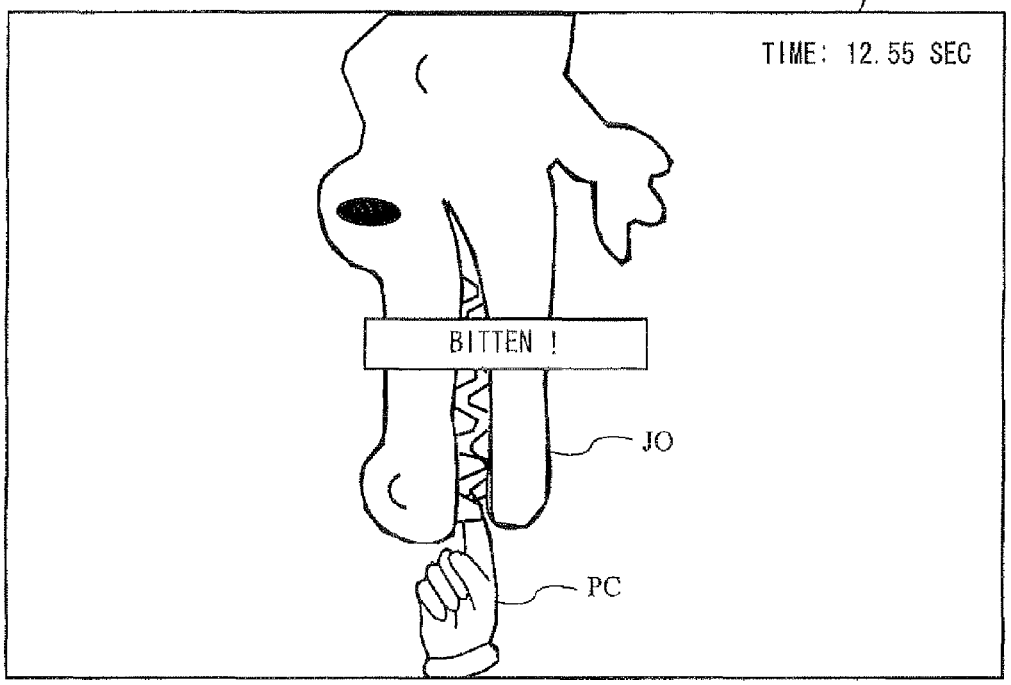
FIG. 12 is a diagram showing an example of the game image displayed on the monitor 2.

When the player inserts a finger in the gap in the vital sensor 76, i.e., when the player wears the vital sensor 76, the player character PC moves so that the index finger represented as the player character PC is put in the mouth of the crocodile shown as the determination object JO. For example, as shown in FIG. 11, the determination object JO with its mouth open is displayed from the top toward the bottom in the display screen of the monitor 2. When the player wears the vital sensor 76, the player character PC, with its index finger pointing upward in the display screen of the monitor 2, moves upward (along the direction of an outlined arrow shown in FIG. 11) from the bottom of the display screen toward the determination object JO. Then, the player character PC stops its upward movement when the pointing-up index finger reaches into the mouth of the determination object JO.

When the player wears the vital sensor 76, time count is started. When a predetermined time period has elapsed, the mouth of the determination object JO is closed. Therefore, if the pointing-up index finger of the player character PC is inside the mouth of the determination object JO, the index finger of the player character PC is bitten by the determination object JO, and thus the player fails in the game (see FIG. 12).

Figure 13:
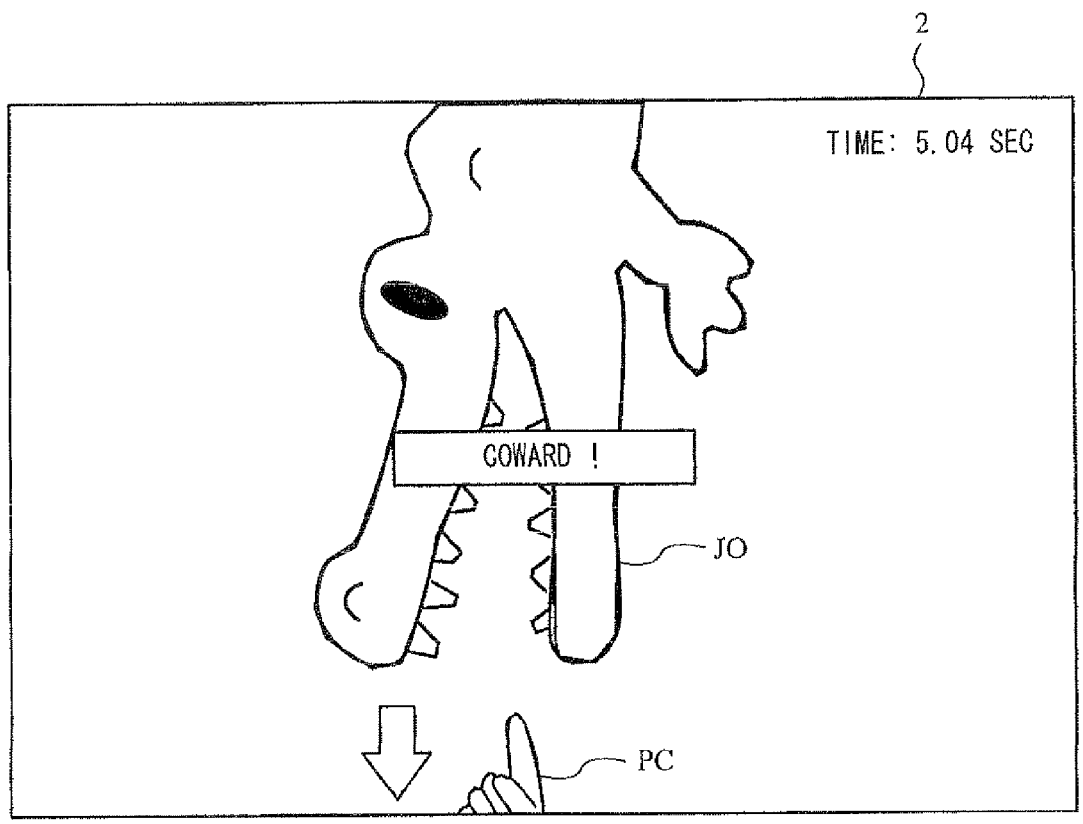
FIG. 13 is a diagram showing an example of the game image displayed on the monitor 2.

On the other hand, when the player removes the finger from the gap in the vital sensor 76, i.e., when the vital sensor 76 is detached, the player character PC moves so that the index finger represented as the player character PC goes out of the mouth of the determination object JO. For example, as shown in FIG. 13, when the vital sensor 76 is detached, the player character PC, with its index finger pointing upward in the display screen of the monitor 2, moves toward the bottom of the display screen (along the direction of an outlined arrow shown in FIG. 13). Then, the pointing-up index finger of the player character PC goes out of the mouth of the determination object JO. If the player removes the finger from the gap in the vital sensor 76 at a too early timing before the determination object JO closes the mouth, it is shown that the player is disqualified in the game. For example, as shown in FIG. 13, if the timing when the player removes the finger from the gap in the vital sensor 76 is too early, textual information "COWARD!" informing that the player is disqualified in the game is displayed.

As described above, in the game shown in FIGS. 10 to 13, the game is started at the timing when the player wears the vital sensor 76, and whether the player succeeds or fails in the game is determined depending on the timing when the player removes the finger from the vital sensor 76, i.e., at the timing when the vital sensor 76 is detached.

Figure 14:
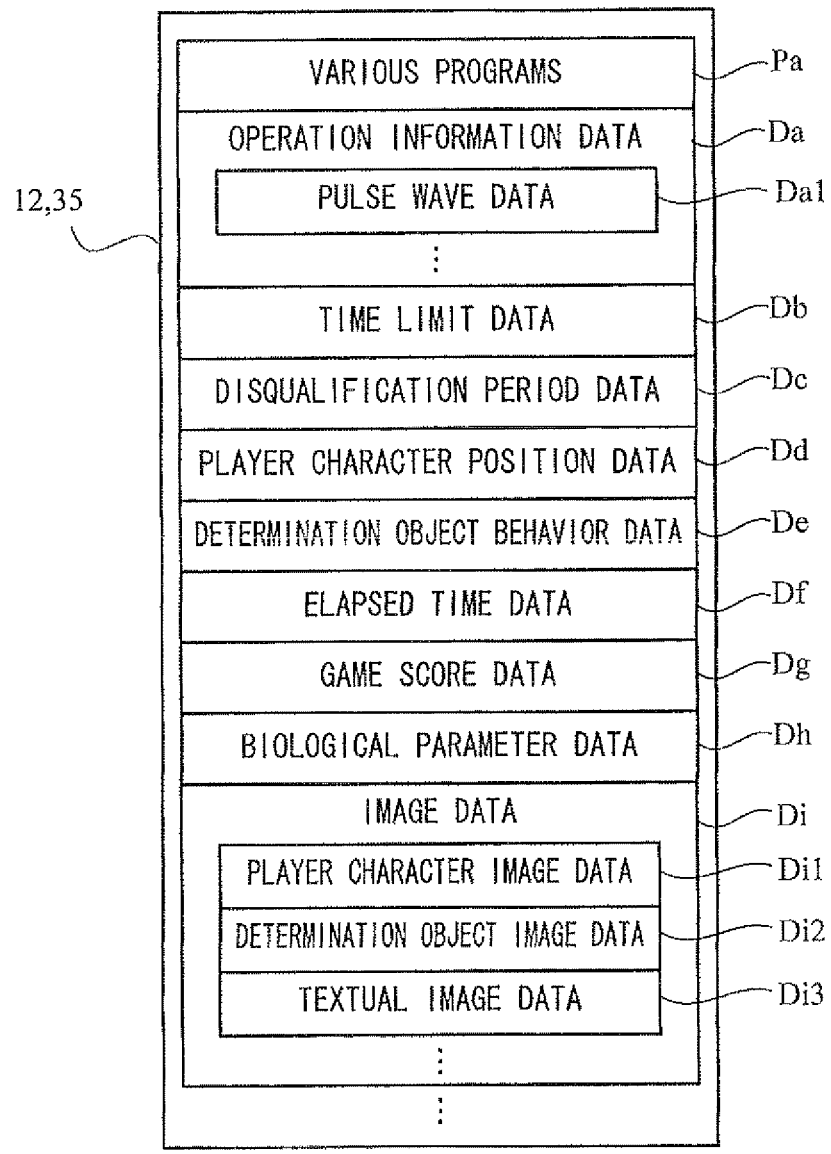
FIG. 14 is a diagram showing an example of main data and programs that are stored in a main memory of the game apparatus body 5.

The following will describe in detail the game processing performed on the game system 1. With reference to FIG. 14, main data used in the game processing will be described. FIG. 14 is a diagram showing an example of main data and programs stored in the external main memory 12 and/or the internal main memory 35 (hereinafter, the two main memories are collectively referred to a main memory) of the game apparatus body 5.

As shown in FIG. 14, a data storage area of the main memory stores therein operation information data Da, time limit data Db, disqualification period data Dc, player character position data Dd, determination object behavior data De, elapsed time data Df, game score data Dg, biological parameter data Dh, image data Di, and the like. Note that, in addition to the data shown in FIG. 14, the main memory stores therein data required for the game processing, such as data (position data and the like) relating to other objects appearing in the game, data (background data and the like) relating to the virtual game world, and the like. A program storage area of the main memory stores therein various programs Pa configuring the game program.

The operation information data Da includes pulse wave data Da1. The pulse wave data Da1 indicates a pulse wave signal (biological signal) obtained from the vital sensor 76, and is included in the series of pieces of operation information transmitted as transmission data from the core unit 70. Pulse wave data stored in the pulse wave data Da1 is continuously updated to latest data in accordance with reception of the operation information transmitted from the core unit 70. There is a case where a history of the pulse wave signal corresponding to a time length required for a selected game may be stored as the pulse wave data in the pulse wave data Da1. Also in this case, the history is appropriately updated in accordance with reception of the operation information. Further, the wireless controller module 19 included in the game apparatus body 5 receives biological signal data included in the operation information transmitted from the core unit 70 in predetermined cycles (e.g., every 1/200 sec.) and stores the received data into a buffer (not shown) included in the wireless controller module 19. Thereafter, the biological signal data stored in the buffer is read every one-frame period (e.g., every 1/60 sec.), which corresponds to a game processing cycle, and thereby the pulse wave data Da1 in the main memory is updated.

In this case, the cycle of the reception of the operation information is different from the processing cycle, and therefore, a plurality of pieces of operation information received at a plurality of timings are stored in the buffer. In a description of the processing below, only the latest one of a plurality of pieces of operation information received at a plurality of timings is invariably used to perform a process at each step described below, and the processing proceeds to the next step.

In addition, a process flow will be described below by using an example in which the pulse wave data Da1 is updated every one-frame period, which corresponds to the game processing cycle. However, the pulse wave data Da1 may be updated in other processing cycles. For example, the pulse wave data Da1 may be updated in transmission cycles of the core unit 70, and the updated pulse wave data Da1 may be used in game processing cycles. In this case, the cycle in which the pulse wave data Da1 is updated is different from the game processing cycle.

The time limit data Db indicates a time period from when the player wears the vital sensor 76 to when the mouth of the determination object JO is closed. The disqualification period data Dc indicates a time period in which the player is determined as being disqualified in the game.

The player character position data Dd indicates the position of the player character PC in the virtual game world displayed on the display screen. The determination object behavior data De indicates the behavior of the determination object JO in the virtual game world displayed on the display screen.

The elapsed time data Df indicates an elapsed time from when the player worn the vital sensor 76. The game score data Dg indicates a game score calculated in accordance with the elapsed time. The biological parameter data Dh indicates a biological parameter of the player, such as the heartbeat/pulse timing or the heart rate, which is calculated based on the pulse wave data Da1.

The image data Dr includes player character image data Di1, determination object image data Di2, textual image data Di3, and the like. The player character image data Di1 is data for arranging the player character PC in the virtual game world to generate a game image. The determination object image data Di2 is data for arranging the determination object JO in the virtual game world to generate a game image. The textual image data Di3 is data for generating a textual image that prompts the player to wear the vital sensor 76, and informs the player of the result of the game.

Figure 16:
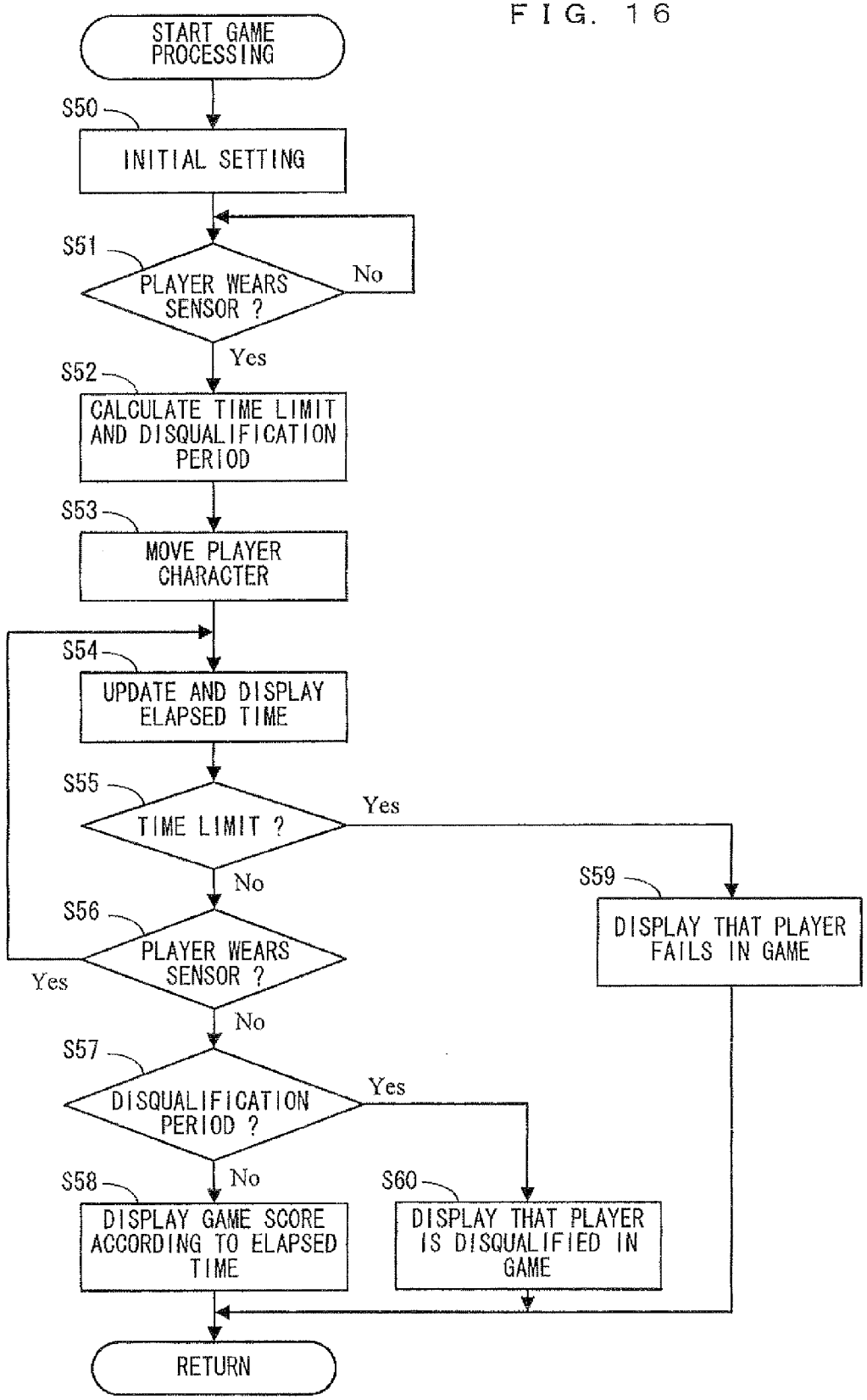
FIG. 16 is a subroutine flowchart showing an example of detailed processing of the game processing shown in step 43 in FIG. 15.

Next, the game processing performed on the game apparatus body 5 will be described in detail with reference to FIGS. 15 and 16. FIG. 15 is a flowchart showing an example of main processing executed on the game apparatus body 5. FIG. 16 is a subroutine flowchart showing an example of detailed processing of a game process shown in step 43 in FIG. 15. In the flowcharts shown in FIGS. 15 and 16, processes using a biological signal obtained from the vital sensor 76 will be mainly described, while other game processes that do not directly relate to the present invention will not be described in detail. In FIGS. 15 and 16, each step executed by the CPU 10 is abbreviated to "S".

When the game apparatus body 5 is powered on, the CPU 10 of the game apparatus body 5 executes the boot program stored in the ROM/RTC 13, thereby initializing each unit such as the main memory. Thereafter, the game program stored in the optical disc 4 is loaded into the main memory, and the CPU 10 starts execution of the game program. The flowchart shown in FIG. 15 indicates the main processing to be performed after completion of the aforementioned process.

In FIG. 15, the CPU 10 determines whether a game is selected by the player (step 41). For example, the CPU 10 displays, on the monitor 2, options indicating a plurality of playable games to prompt the player to select a game. When the player selects to play one of the games, the CPU 10 advances the process to step 42. On the other hand, when the player does not select to play a game, the CPU 10 advances the process to step 44.

In step 42, the CPU 10 determines whether the game selected in step 41 is a game using a biological parameter. When the game selected in step 41 is a game using no biological parameter, the CPU 10 advances the process to step 43. On the other hand, when the game selected in step 41 is a game using a biological parameter, the CPU 10 advances the process to step 45.

In step 43, the CPU 10 executes a game processing using no biological parameter, and advances the process to step 44. Hereinafter, the game process performed in step 44 will be described with reference to FIG. 16.

In FIG. 16, the CPU 10 performs initial setting (step 50), and advances the process to the next step. For example, in the initial setting in step 50, the CPU 10 performs setting of the virtual game world and initial setting of the positions, status, and the like of the player character PC and the determination object JO. Further, in the initial setting in step 50, the CPU 10 initializes the respective parameters to be used in the subsequent game processing. For example, by the initial setting in step 50, the virtual game world in which the player character PC and the determination object JO are arranged is displayed on the monitor 2, and textual information that prompts the player to insert a finger in the gap in the vital sensor 76 is displayed on the monitor 2 (the state in FIG. 10).

Next, the CPU 10 waits until the player wears the vital sensor 76 (step 51). When the player wears the vital sensor 76, the CPU 10 advances the process to step 52. For example, in step 51, the CPU 10 obtains, from the core unit 70, data representing operation information, and updates the pulse wave data Da1 using the latest biological signal data included in the operation information. Then, the CPU 10 determines whether or not the value of the pulse wave signal (biological signal) indicated by the updated pulse wave data Da1 is equal to or greater than the threshold value (see FIG. 9B) used for determining whether the player wears the vital sensor 76. The data which is continuously updated and stored as the pulse wave data Da1 is data indicating the biological signal (pulse wave signal) outputted from the vital sensor 76, and the data indicates a detected value (e.g., a photoelectric voltage) of the photodetector 763 of the vital sensor 76, which is obtained when the photodetector 763 receives the infrared light. In this example, the circuit of the photodetector 763 is configured such that the detected value of the photodetector 763 increases when the blood flow rate in the inserted fingertip increases, and decreases when the blood flow rate in the inserted fingertip decreases. Accordingly, in step 51, if the detected value of the photodetector 763 is equal to or greater than the threshold value for determining whether the player wears the vital sensor 76, it is determined that the player wears the vital sensor 76.

In step 52, the CPU 10 calculates a time limit and a disqualification period, and advances the process to the next step. For example, the CPU 10 randomly sets a time until the mouth of the determination object JO is closed (a time until a time limit), and updates the time limit data Db using the set time. Further, the CPU 10 sets, in accordance with the time until the mouth of the determination object JO is closed, a period (disqualification period) in which the player is determined to be disqualified in the game, and updates the disqualification period data Dc using the set period. The length of the disqualification period is shorter than the time indicating the time limit, and for example, it is set to a time length obtained by subtracting a predetermined period from the time indicating the time limit. The disqualification period is set as a period from when the player wears the vital sensor 76 to when a time corresponding to the calculated length of the disqualification period elapses.

Next, the CPU 10 moves the player character PC and displays the player character PC on the monitor 2 (step 53), and advances the process to the next step. For example, the CPU 10 changes the position of the player character PC so that the index finger represented as the player character PC is inserted into the mouth of the determination object JO, and updates the player character position data Dd using the changed position of the player character PC. Then, the CPU 10 moves the player character PC, based on the position indicated by the player character position data Dd, and displays the player character PC on the monitor 2 (the state shown in FIG. 11).

Next, the CPU 10 updates the elapsed time and displays the updated elapsed time on the monitor 2 (step 54), and advances the process to the next step. For example, the CPU 10 obtains the elapsed time at the current time point with reference to the elapsed time data Df, adds, to the elapsed time, a period (e.g., 1/60 sec.) according to the processing cycle, and updates the elapsed time data Df using the elapsed time obtained after the addition. Then, the CPU 10 displays the elapsed time indicated by the elapsed time data Df on the monitor 2. In the example shown in FIG. 11, it is displayed that the elapsed time is 1.85 sec.

Next, the CPU 10 determines whether the current time point has reached the time limit (step 55). For example, the CPU 10 determines whether the elapsed time has reached the time until the time limit, with reference to the time until the time limit indicated by the time limit data Db and the elapsed time indicated by the elapsed time data Df. If the current time point has not yet reached the time limit, the CPU 10 advances the process to step 56. On the other hand, if the current time point has reached the time limit, the CPU 10 advances the process to step 59.

In step 56, the CPU 10 determines whether the player wears the vital sensor 76. If the player still wears the vital sensor 76, the CPU 10 returns to step 54 to repeat the processing. On the other hand, if the player does not wear the vital sensor 76, i.e., if the player removes the finger from the gap in the vital sensor 76, the CPU 10 advances the process to step 57. For example, like in step 51, the CPU 10 obtains the data indicating the operation information from the core unit 70 in step 56, and updates the pulse wave data Da1 using the latest biological signal data included in the operation information. Then, the CPU 10 determines whether or not the value of the pulse wave signal (biological signal) indicated by the updated pulse wave data Da1 is equal to or greater than the threshold value (see FIG. 9B) used for determining whether the player wears the vital sensor 76. Also in this case, the data which continuously updated and stored in the pulse wave data Da1 indicates the biological signal (pulse wave signal) outputted from the vital sensor 76, and the data indicates the detected value of the photodetector 763, which is obtained when the photodetector 763 of the vital sensor 76 receives the infrared light. In step 56, if the detected value of the photodetector 763 is smaller than the threshold value used for determining whether the player wears the vital sensor 76, it is determined that the player removes the finger from the gap in the vital sensor 76. On the other hand, in step 56, if the detected value of the photodetector 763 is equal to or greater than the threshold value used for determining whether the player wears the vital sensor 76, it is determined that the player still wears the vital sensor 76.

In step 57, the CPU 10 determines whether the current time point is in the disqualification period. For example, the CPU 10 determines whether the elapsed time is in the disqualification period, with reference to the disqualification period indicated by the disqualification period data Dc and the elapsed time indicated by the elapsed time data Df. When the current time point is outside the disqualification period, the CPU 10 advances the process to step 58. On the other hand, if the current time point is in the disqualification period, the CPU 10 advances the process to step 60.

In step 58, the CPU 10 moves the player character PC, and displays, on the monitor 2, a game score depending on the elapsed time, thereby completing the process of the subroutine. For example, the CPU 10 changes the position of the player character PC so that the index finger represented as the player character PC goes out of the mouth of the determination object JO, and updates the player character position data Dd using the updated position of the player character PC. Then, the CPU 10 moves the player character PC, based on the position indicated by the player character position data Dd, and displays the player character PC on the monitor 2. Further, the CPU 10 calculates a game score using the elapsed time indicated by the elapsed time data Df, and updates the game score data Dg using the calculated game score. Typically, the longer the elapsed time indicated by the elapsed time data Df is, the higher the game score calculated by the CPU 10 is. Then, the CPU 10 displays the game core on the monitor 2, based on the game score indicated by the game score data Dg.

On the other hand, in step 59, the CPU 10 causes the determination object JO to close its mouth, and displays, on the monitor 2, a message which informs the player that the player has failed in the game, thereby completing the process of the subroutine. For example, the CPU 10 sets, in the determination object operation data De, data representing that the determination object JO is caused to behave so that the determination object JO bites the index finger of the player character PC, and causes the determination object JO to behave according to the contents described in the determination object operation data De (the state shown in FIG. 12). Further, the CPU 10 displays, on the monitor 2, textual information representing that the player has failed in the game. For example, in the example shown in FIG. 12, textual information "BITTEN!" representing that the player has failed in the game is displayed on the monitor 2.

In step 60, the CPU 10 moves the player character PC, and displays, on the monitor 2, a message informing that the player has disqualified in the game, thereby completing the process of the subroutine. For example, the CPU 10 changes the position of the player character PC so that the index finger represented as the player character PC goes out of the mouth of the determination object JO, and updates the player character position data Dd using the changed position of the player character PC. Then, the CPU 10 moves the player character PC based on the position indicated by the player character position data Dd, and displays the player character PC on the monitor 2 (the state shown in FIG. 13). Further, the CPU 10 displays, on the monitor 2, textual information representing that the player has disqualified in the game. For example, in the example shown in FIG. 13, textual information "COWARD!" representing that the player has disqualified in the game is displayed on the monitor 2.

As described above, in the above-described game processing, the game is started at the timing when the player wears the vital sensor 76. If the player removes the finger from the vital sensor 76 during the disqualification period (Yes in step 57), that is, if the player removes the finger from the vital sensor 76 at a too early timing after the player wore the vital sensor 76, the player is determined to be disqualified in the game. On the other hand, if the player wears the vital sensor 76 until the time limit expires (Yes in step 55), the index finger of the player character PC is bitten by the determination object JO, and thus the player fails in the game. Accordingly, in order for the player to success in the game and get a high score, the player must remove the finger from the vital sensor 76 at a timing which is outside the disqualification period (No in step 57) and does not reach the time limit (No in step 55). Thus, even in the case where the game is started and the success/failure in the game is determined depending on the timing when the player wears/removes the vital sensor 76, highly-responsive game processing is realized by directly using a biological signal of the player, which is outputted from the vital sensor 76.

Turning to FIG. 15, in step 42, if it is determined that the game selected in step 41 is a game using a biological parameter, the CPU 10 performs a process to calculate the biological parameter (step 45), and advances the process to the next step. For example, the CPU 10 obtains the data indicating the operation information from the core unit 70, and updates the pulse wave data Da1 using the latest biological signal data included in the operation information. Then, the CPU 10 calculates, based on the pulse wave data Da1, a biological parameter of the player, which is required for the game processing in step 46, and updates the biological parameter data Dh using the calculated biological parameter. Examples of the player's biological parameter required for the game processing in step 46 may include: a timing of heartbeat or pulse, a heart rate, a respiratory cycle, an amplitude of a pulse wave, a degree of easiness/difficulty, a blood flow rate, a CVRR, and the like, which are obtained from the player. Thus, various parameters depending on the game contents are considered. These biological parameters must be calculated based on a biological signal repeatedly obtained from the player (e.g., a biological signal continuously obtained from the player per unit time). Therefore, as the pulse wave data to be stored in the pulse wave data Da1, a history of the pulse wave signal corresponding to a desired time length is stored depending on the selected game and the biological parameter required for the game.

Next, the CPU 10 performs the game processing using at least the biological parameter of the player (step 46), and advances the process to the next step. For example, the CPU 10 performs the game processing to execute the game selected in step 41 by using the biological parameter of the player, which is represented by the biological parameter data Dh. For example, the CPU 10 causes the object in the virtual game world to behave in response to the player's heartbeat/pulse timing, or heart rate, and/or changes the color or shape of the object in the virtual game world in response to the player's heart rate. Alternatively, the CPU 10 displays, on the monitor 2, the value of the player's biological parameter, or a diagram (graph) that varies depending on the value. Although a variety of other games are considered as examples of the game processing performed in step 46, those games are not described herein.

Next, the CPU 10 determines whether to end the game using the player's biological parameter (step 47). The game is to be ended, for example, when conditions for game over are satisfied, or when the player has performed an operation to end the game. When the game is not to be ended, the CPU 10 returns to step 45 to repeat the processing. When the game is to be ended, the CPU 10 advances the process to step 44.

In step 44, the CPU 10 determines whether to end the processing of the flowchart shown in FIG. 15. The game is to be ended, for example, when the player has performed an operation to end the game. When the game is not to be ended, the CPU 10 returns to step 41 to repeat the processing. When the game is to be ended, the CPU 10 ends the processing of the flowchart.

Next, with reference to FIGS. 17 to 20, another example of a game processing in step 43, which is performed in the game apparatus body 5, will be described. FIGS. 17 to 20 are diagrams illustrating game images of the other game processing, which are displayed on the monitor 2.

Figure 17:
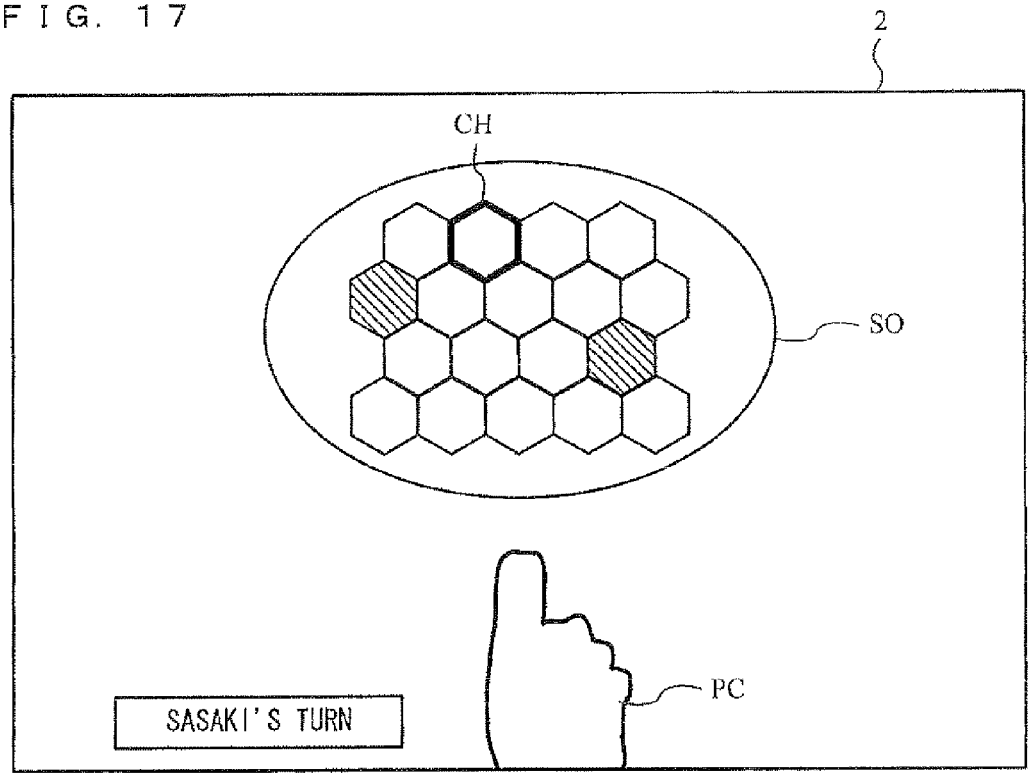
FIG. 17 is a diagram showing another example of a game image displayed on the monitor 2.
Figure 18:
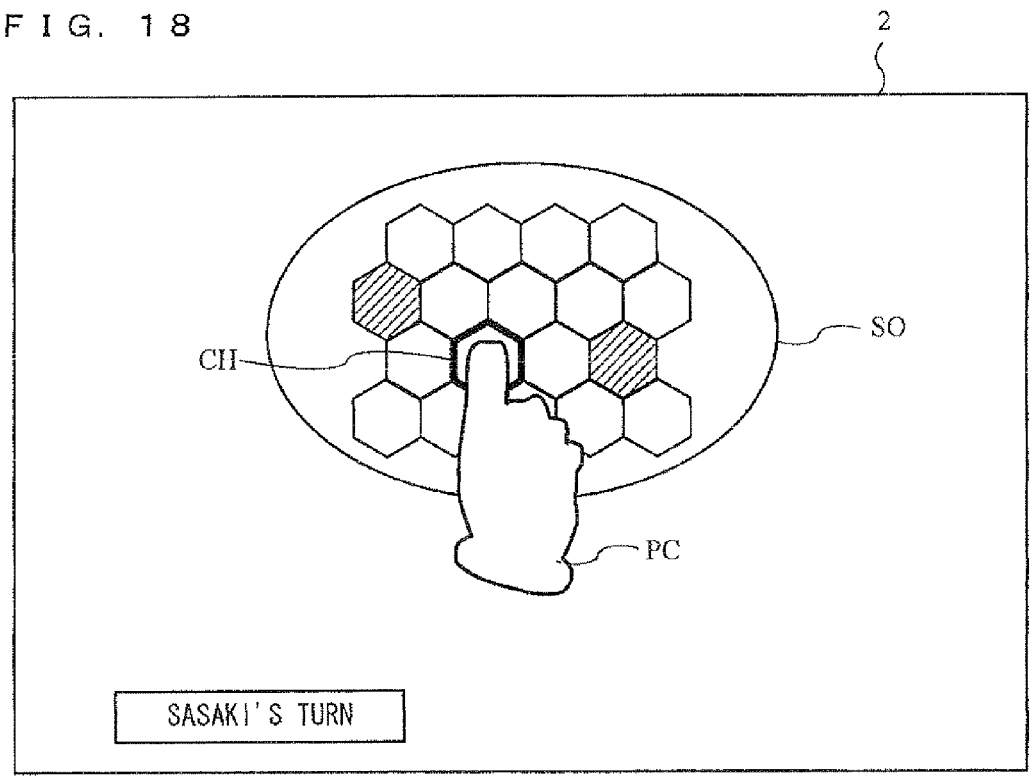
FIG. 18 is a diagram showing another example of the game image displayed on the monitor 2.

In FIG. 17, a virtual game world in which a player character PC and a selection object SO are arranged is represented on the monitor 2. In the example of FIG. 17, an image that simulates a human hand with its index finger bending toward the depth direction of the drawing sheet is shown as a player character PC, and an image that simulates a beehive is shown as a selection object SO. Specifically, the selection object SO represents a honeycomb structure constituted by a comb foundation having a plurality of hexagonal chambers. This game is played by a plurality of players in turns, and textual information "Sasaki's turn" indicating a player in turn is displayed on the monitor 2.

Among the plurality of chambers provided in the selection object SO, a target chamber being currently selected (selected area CH) is presented to the player. The selected area CH shows a chamber into which the index finger of the player character PC is to be inserted if the player performs an instruction that causes the player character PC to insert the finger into the chamber. The selected area CH sequentially shifts to other selectable chambers with time. For example, chambers already selected by other players are set as nonselectable chambers, and are displayed distinctively from other chambers. In FIG. 17, the nonselectable chambers are hatched. When the player inserts a finger in the gap in the vital sensor 76, that is, when the player wears the vital sensor 76, the player character PC moves so that the index finger of the player character PC is inserted into the chamber specified as the selected area CH (the state shown in FIG. 18).

Figure 19:
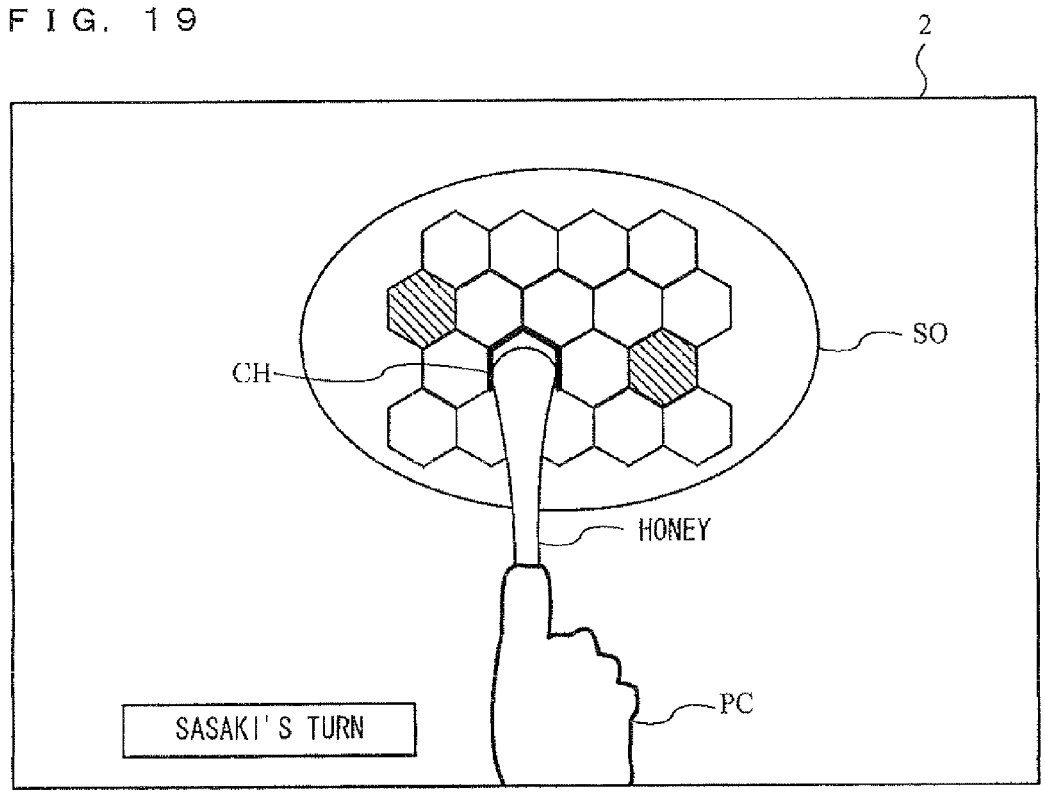
FIG. 19 is a diagram showing another example of the game image displayed on the monitor 2.
Figure 20:
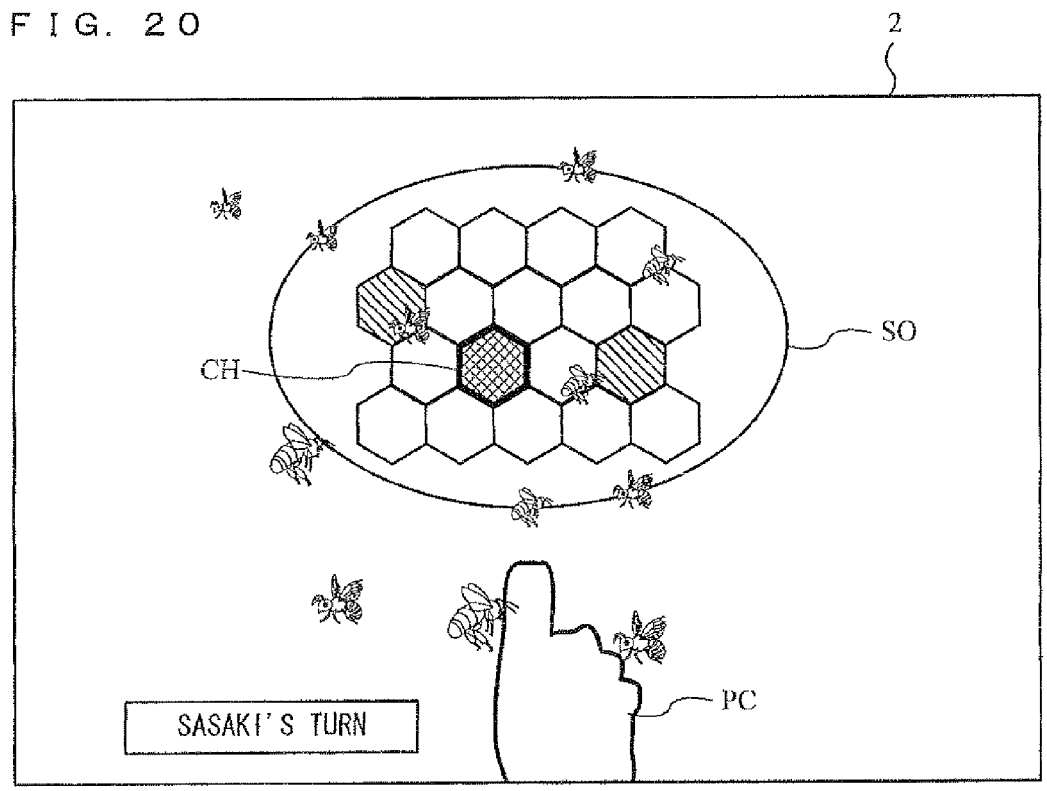
FIG. 20 is a diagram showing another example of the game image displayed on the monitor 2.

When the player removes the finger from the gap in the vital sensor 76, that is, when the vital sensor 76 is detached, the player character PC moves so that the index finger represented as the player character PC goes out of the chamber specified as the selected area CH (the states shown in FIGS. 19 and 20). When the chamber specified as the selected area CH is a correct chamber, a game image in which honey flows out of the chamber is displayed, and thus the player succeeds in the game (the state shown in FIG. 19). On the other hand, when the chamber specified as the selected area CH is a wrong chamber, a game image in which bees fly out of the chamber is displayed, and thus the player fails in the game (the state shown in FIG. 20).

As described above, in the game shown in FIGS. 17 to 20, a selected chamber is determined at the timing when the player wears the vital sensor 76, and whether the player has succeeded or failed in the game is clarified when the player removes the finger from the vital sensor 76, that is, when the vital sensor 76 is detached from the player.

Figure 21:
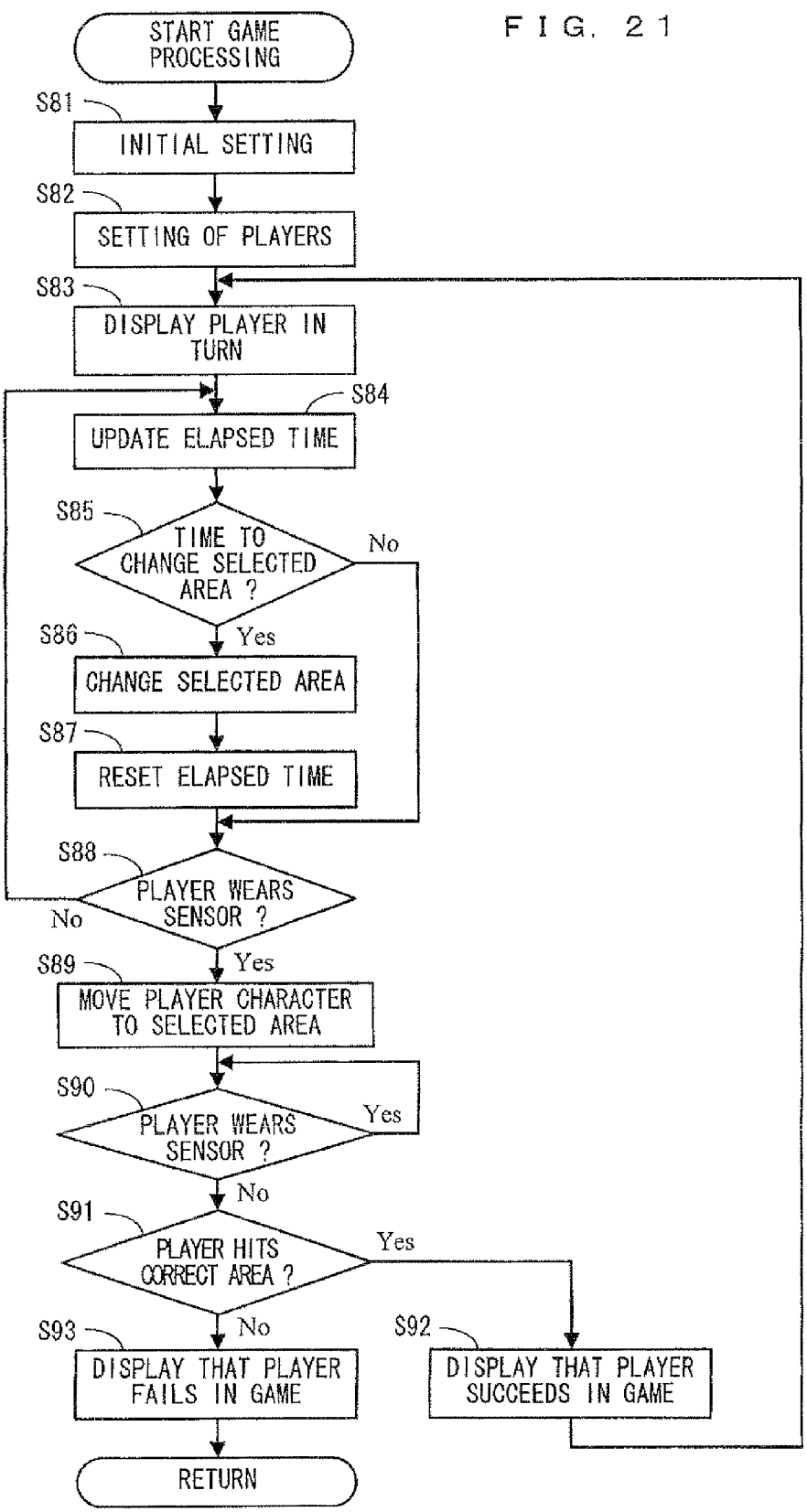
FIG. 21 is a subroutine flowchart showing another example of detailed processing of the game processing shown in step 43 in FIG. 15.

Next, the other example of the game processing performed in the game system 1 will be described in detail with reference to FIG. 21. FIG. 21 is a subroutine showing an example of detailed processes of the other example of the game processing shown in step 43 in FIG. 15. In FIG. 21, each step executed by the CPU 10 is abbreviated to "S".

In FIG. 21, the CPU 10 performs initial setting (step 81), and advances the process to the next step. For example, in the initial setting in step 81, the CPU 10 initializes the setting of the virtual game world, the position of the player character PC, the status of the selection object SO, and the like. The CPU 10 sets at least one of the plurality of chambers of the selection object SO as a "wrong chamber", and sets the other chambers as "correct chambers". Further, in the initial setting in step 81, the CPU 10 initializes the respective parameters to be used in the subsequent game processing, and displays the set virtual game world on the monitor 2.

Next, the CPU 10 performs setting of players who will play the game selected in step 41 (step 82), and advances the process to the next step. For example, in step 82, the CPU 10 sets the number, names, and order of the players who will play the game selected in step 41, based on an operation by the player, and stores, in the main memory, the data indicating the setting.

Next, the CPU 10 selects, in accordance with the set order of players, a player in turn, and displays, on the monitor 2, textual information representing the player in turn (step 83). Then, the CPU 10 advances the process to the next step. For example, through the processes in steps 81 to 83, the virtual game world in which the player character PC and the selection object SO are arranged is displayed on the monitor 2, and the textual information representing the player in turn is also displayed on the monitor 2 (the state shown in FIG. 17).

Next, the CPU 10 updates the elapsed time (step 84), and determines whether the current time point is the timing for shifting the selected area CH (step 85). For example, the CPU 10 obtains the elapsed time at the current time point with reference to the data indicating the elapsed time, which is stored in the main memory; and adds a time (e.g., 1/60 sec) according to the game processing cycle to the elapsed time; and then updates the data using the elapsed time obtained after the addition. Next, the CPU 10 determines whether the elapsed time obtained after the addition has reached a predetermined time for shifting the selected area. CH (a predetermined shift time). If the elapsed time has reached the shift time, the CPU 10 advances the process to step 86. On the other hand, if the elapsed time has not yet reached the shift time, the CPU 10 advances the process to step 88.

In step 86, the CPU 10 shifts the selected area CH to another selectable chamber, and displays the selected area CH on the monitor 2, and then advances the process to the next step. For example, the CPU 10 shifts the current selected area CH to another selectable chamber, and updates the data indicating the position of the selected area, which is stored in the main memory. Then, the CPU 10 shifts the selected area CH to the other chamber based on the data, and displays the selected area CH on the monitor 2.

Next, the CPU 10 resets the elapsed time (step 87), and advances the process to step 87. For example, the CPU 10 resets, to an initial value (e.g., 0), the elapsed time at the current time point, with reference to the data indicating the elapsed time, which is stored in the main memory, and then updates the data using the reset elapsed time.

In step 88, the CPU 10 determines whether the player wears the vital sensor 76. If the player wears the vital sensor 76, the CPU 10 advances the process to step 89. If the player does not wear the vital sensor 76, the CPU 10 returns to step 84 to repeat the processing. For example, in step 88, the CPU 10 obtains, from the core unit 70, data representing operation information, and updates the pulse wave data Da1 using the latest biological signal data included in the operation information. Then, the CPU 10 determines whether or not the value of the pulse wave signal (biological signal) indicated by the updated pulse wave data Da1 is equal to or greater than the threshold value (see FIG. 9B) used for determining whether the player wears the vital sensor 76. The data which is continuously updated and stored in the pulse wave data Da1 is data indicating the biological signal (pulse wave signal) outputted from the vital sensor 76, and the data indicates a detected value (e.g., a photoelectric voltage) of the photodetector 763 of the vital sensor 76, which is obtained when the photodetector 763 receives the infrared light. In step 88, if the detected value of the photodetector 763 is equal to or greater than the threshold value for determining whether the player wears the vital sensor 76, it is determined that the player wears the vital sensor 76. On the other hand, in step 88, if the detected value of the photodetector 763 is smaller than the threshold value for determining whether the player wears the vital sensor 76, it is determined that the player does not wear the vital sensor 76.

In step 89, the CPU 10 moves the player character PC to the selected area displays the player character PC on the monitor 2, and advances the process to the next step. For example, the CPU 10 changes the position of the player character PC so that the index finger of the player character PC is inserted into the chamber specified by the selected area CH, and updates the data indicating the player character position, which is stored in the main memory, using the changed position of the player character PC. Then, the CPU 10 moves the player character PC based on the player character position indicated by the data, and displays the player character PC on the monitor 2 (the state shown in FIG. 18).

Next, the CPU 10 waits until the player removes the finger from the gap in the vital sensor 76 (step 90). When the player removes the finger from the gap in the vital sensor 76, that is, when the vital sensor 76 is detached from the player, the CPU 10 advances the process to step 91. For example, in step 90, like in step 88, the CPU 10 obtains, from the core unit 70, the data representing the operation information, and updates the pulse wave data Da1 using the latest biological signal data included in the operation information. Then, the CPU 10 determines whether or not the value of the pulse wave signal (biological signal) indicated by the updated pulse wave data Da1 is equal to or greater than the threshold value (see FIG. 9B) used for determining whether the player wears the vital sensor 76. The data which is continuously updated and stored in the pulse wave data Da1 is data indicating the biological signal (pulse wave signal) outputted from the vital sensor 76, and the data indicates a detected value (e.g., a photoelectric voltage) of the photodetector 763 of the vital sensor 76, which is obtained when the photodetector 763 receives the infrared light. In step 90, if the detected value of the photodetector 763 is smaller than the threshold value for determining whether the player wears the vital sensor 76, it is determined that the player has removed the finger from the gap in the vital sensor 76. On the other hand, in step 90, if the detected value of the photodetector 763 is equal to or greater than the threshold value for determining whether the player wears the vital sensor 76, it is determined that the player still wears the vital sensor 76.

In step 91, the CPU 10 determines whether the selected area CH in which the index finger of the player character PC has been inserted in step 89 is a correct chamber or an incorrect chamber. For example, the CPU 10 determines whether the current selected area CH is a correct chamber or an incorrect chamber, based on the setting of the selection object SO in step 81. When the selected area CH is a correct chamber, the CPU 10 advances the process to step 92. On the other hand, when the selected area CH is an incorrect chamber, the CPU 10 advances the process to step 93.

In step 92, the CPU 10 moves the player character PC, and displays, on the monitor 2, a game image representing that the player has succeeded in the game. Then, the CPU 10 returns to step 83 to repeat the processing. For example, the CPU 10 changes the position of the player character PC so that the index finger of the player character PC goes out of the chamber specified as the selected area CH, and updates the data indicating the player character position, which is stored in the main memory, using the changed position of the player character PC. Then, the CPU 10 moves the player character PC based on the player character position indicated by the data, and displays the player character PC on the monitor 2. Further, the CPU 10 displays, on the monitor 2, a game image in which honey flows out of the chamber specified as the selected area CH, as a game image representing that the player has succeeded in the game (the state shown in FIG. 19).

On the other hand, in step 93, the CPU 10 moves the player character PC, and displays, on the monitor 2, a game image representing that the player has failed in the game, thereby completing the processing of the subroutine. For example, the CPU 10 changes the position of the player character PC so that the index finger of the player character PC goes out of the chamber specified as the selected area CH, and updates the data indicating the player character position, which is stored in the main memory, using the changed position of the player character PC. Then, the CPU 10 moves the player character PC based on the player character position represented by the data, and displays the player character PC on the monitor 2. Further, the CPU 10 displays, on the monitor 2, a game image in which bees fly out of the chamber specified as the selected area, as a game image representing that the player has failed in the game (the state shown in FIG. 20).

As described above, in the above-described game processing, the selected area CH is determined depending on the timing when the player wears the vital sensor 76, and whether the player has succeeded or failed in the game is clarified when the player removes the finger from the vital sensor 76, that is, when the vital sensor 76 is detached from the player. When the player has succeeded in the game, the next player takes a turn. The game is continued until someone fails in the game. In this way, even in a game where one of a plurality of options is selected depending on the timing when the player wears the vital sensor 76, and a result relating to the selected option is clarified at the timing when the player removes the vital sensor 76, it is possible to realize highly-responsive game processing by directly using a biological signal of the player, which is outputted from the vital sensor 76.

As is understood from the main processing shown in FIG. 15, the game apparatus body 5 is capable of calculating a biological parameter based on a biological signal repeatedly obtained from the player (e.g., a biological signal continuously obtained from the player per unit time), and performing game processing using the biological parameter. In such a game apparatus, it is general to reflect change in the biological parameter to the game processing. However, the use of the biological parameter may deteriorate the responsiveness until the biological signal obtained from the player is reflected to the game processing. The game apparatus body 5 realizes, even in the situation where the biological parameter is used, highly-responsive game processing by using change in the biological signal used for calculating the biological parameter.

The above-described examples of the games include: the game in which the player competes for the time during which he/she can maintain the state where the index finger of the player character PC is inserted in the mouth of the determination object JO in the virtual game world; and the game in which the player enjoys whether he/she hits a correct chamber or an incorrect chamber using the index finger of the player character being inserted in the selected area CH of the selection object SO. However, the present invention is also applicable to other games. The present invention is applicable to game processing in which predetermined processes are performed according to the timing when the player wears the vital sensor 76 and/or the timing when the player removes the vital sensor 76. For example, an object that will fall after an elapse of a predetermined period of time is arranged in a virtual game world. Then, a game is assumed in which, when the player is wearing the vital sensor 76, a player character is arranged at a position beneath the object in the virtual game world, and when the player removes a finger from the vital sensor 76, the player character evacuates from the position beneath the object. Also in such a game, the game is started at the timing when the player wears the vital sensor 76, and whether the player has succeeded or failed in the game is determined at the timing when the player removes the vital sensor 76. Thus, highly-responsive game processing is realized by directly using a biological signal of the player, which is outputted from the vital sensor 76.

Further, in the example of the game described with reference to FIGS. 10 to 16, if the player removes the finger from the gap in the vital sensor 76 during the disqualification period, the player is disqualified in the game. However, whether the player has succeeded or failed in the game may only be determined. In this case, setting of the disqualification period in step 52 in FIG. 16 is not required, and the processes in steps 57 and 60 are not required. Then, in the process in step 58, a game score, which becomes higher when the elapsed time is longer, is calculated. Thereby, the earlier the timing when the player removes the finger from the gap in the vital sensor 76 is, the lower the game score becomes. Thus, in the example of the game described with reference to FIGS. 10 to 16, it is possible to perform setting such that a player who removes a finger from the gap in the vital sensor 76 at an earlier timing gets a lower score, even without determining disqualification in the game.

Further, in the game described with reference to FIGS. 10 to 16, when the current time point has reached the time limit, the index finger of the player character P is bitten by the mouth of the determination object JO, and thus the player fails in the game. However, even after the time limit has expired, the game may be continued, and the count of the elapsed time may also be continued. For example, an object which moves with time after the player wears the vital sensor 76 is set in a virtual game world, and the movement of the object stops in response to that the player removes the finger from the gap in the vital sensor 76. Then, a game is assumed, in which a target position where a highest score is obtained when the object stops therein is set in the virtual game world, and the score gradually decreases with an increase in the distance between the target position and the position where the object stops. In this case, a time period, from when the player wears the vital sensor 76 to when the player removes the finger from the gap in the vital sensor 76 to stop the object at the target position, may be treated as the above-described time until the time limit. Alternatively, this time period may be treated as a time representing the best timing in the game (best timing period). In this game, a game score is calculated based on a difference from the best timing period, and even after the best timing period has elapsed, the game is continued and the count of the elapsed time is continued. In this game, whether the player has succeeded or failed in the game is not necessarily determined depending on whether the player has reached the best timing period. For example, in this game, only the game score, which is calculated based on a difference from the best timing period, may be displayed on the monitor 2, and the rank of the game result may be represented by means of only the game score.

In the game described with reference to FIGS. 10 to 16, a game image which informs the player that the game is started is displayed in response to that the player wears the vital sensor 76. However, the start of the game may be informed to the player by another method. For example, the start of the game may be informed to the player by only voice in response to that the player wears the vital sensor 76. Further, also the result of the game, which is determined according to the timing when the player removes the finger from the gap in the vital sensor 76, may be informed to the player by only voice.

In the game described with reference to FIGS. 17 to 21, whether the selected chamber is a correct chamber or an incorrect chamber is clarified at the timing when the player removes the finger from the gap in the vital sensor 76. However, whether the selected chamber is a correct chamber or an incorrect chamber may be clarified independently of the timing when the player removes the finger from the gap in the vital sensor 76. For example, whether the selected chamber is a correct chamber or an incorrect chamber may be clarified at the timing when the player wears the vital sensor 76 and selects one from among the plurality of chambers included in the selection object SO. In this case, the player character PC is moved to the selected area CH in response to that the player wears the vital sensor 76, and when the selected area CH is a correct chamber, a game image in which honey flows out of the chamber in the selected area CH is displayed on the monitor 2 to inform the player that the player has succeeded in the game. On the other hand, the player character is moved to the selected area CH in response to that the player wears the vital sensor 76, and when the selected area CH is an incorrect chamber, a game image in which bees fly out of the chamber in the selected area CH is displayed on the monitor 2 to inform the player that the player has failed in the game.

Furthermore, in the game described with reference to FIGS. 17 to 21, the game image that informs the player of the result of the game is displayed at the timing when the player removes the finger from the gap in the vital sensor 76. However, the result of the game may be informed to the player by another method. For example, the result of the game may be informed to the player by only voice in accordance with the timing when the player removes the finger from the vital sensor 76.

In the above-described examples of the games, each game is advanced without using a biological parameter of the player. However, a biological parameter of the player may be used in the game. For example, after the player wears the vital sensor 76 (Yes in step 51 or Yes in step 88), if the pulse wave of the player becomes measurable from the biological signal obtained from the vital sensor 76 (e.g., if the amplitude PA of the pulse wave, or the heart rate HR becomes calculable), the calculable biological parameter of the player can be reflected to the game.

For example, in the case of the game described with reference to FIGS. 10 to 16, the level of disturbance of the player is calculated such that the smaller the amplitude PA of the pulse wave is, the greater the disturbance of the player is; and the greater the amplitude PA of the pulse wave is, the smaller the disturbance of the player is. Specifically, the level of disturbance obtained when the amplitude PA of the pulse wave of the player reaches a maximum value (i.e., when the player is calm) is 0, and the level of disturbance obtained when the amplitude PA of the pulse wave of the player is half the maximum value (i.e., when the player is considerably disturbed) is 100. The maximum value of the amplitude PA of the pulse wave of the player may be updated during the game. In such a case, the level-of-disturbance calculation formula is also updated using the updated maximum value of the amplitude PA.

In the case of the game described with reference to FIGS. 10 to 16, the calculated level of disturbance of the player is reflected to the game. As a first example, the maximum value of the level of disturbance during the game is stored as a disturbance score. Then, the disturbance score is subtracted from the game score calculated in step 58 to obtain the final game store. Thus, it is possible to realize a game in which the game score is decreased with an increase in the level of disturbance of the player.

As a second example, the level of disturbance of the player is calculated in accordance with the behavior of the determination object JO. Then, the behavior of the determination object JO with which the level of disturbance of the player is relatively high is learned for each player, and the determination object JO is caused to behave based on the result of the learning. For example, it is possible to realize a game in which, depending on the player who plays the game, the determination object JO can be caused to behave so as to increase the level of disturbance of the player.

As a third example, the time limit may be controlled depending on the level of disturbance of the player. For example, if the level of disturbance of the player, which is calculated during the game, is low, that is, if the player is calm, the time until the time limit, which is calculated in step 52, is extended in the process of step 54. On the other hand, if the level of disturbance of the player, which is calculated during the game, is high, that is, if the player is disturbed, the time until the time limit, which is calculated in step 52, is shortened in the process of step 54. Thereby, the calmer the player during the game is, the longer the time until the time limit becomes, and thus the player can aim for a high score in the game. For example, it is possible to disturb the player by causing the determination object JO to perform such a feint movement that the determination object JO tries to bite the player character PC. In this case, it is possible to realize a game in which the player competes for how long the player can hold on without being disturbed.

The first example is applicable to the game described with reference to FIGS. 17 to 21. For example, also in this case, the amplitude PA of the pulse wave of the player is calculated based on the biological signal obtained from the vital sensor 76 after the player wears the vital sensor 76, and the level of disturbance of the player who is wearing the vital sensor 76 is calculated based on the calculated amplitude PA. Then, the maximum value of the level of disturbance during the game is stored as a disturbance score, and the disturbance score is displayed on the monitor 2. Thereby, it is possible to clarify not only whether the player hits a correct chamber or an incorrect chamber in the selection object SO but also the level of disturbance of the player during a period from when the player wears the vital sensor 76 to when it is clarified whether the player hits a correct chamber or an incorrect chamber. Therefore, the situation during the game can be presented to the player. Further, by reflecting the disturbance score in the game to the game score, it is possible to realize a game in which the player competes for not only whether the player hits a correct chamber or an incorrect chamber in the selection object SO but also the player's level of disturbance during the game.

Further, in the above description, a site of the player's body (e.g., a finger tip) is irradiated with infrared light, and a biological signal (pulse wave signal) of the player is obtained based on the amount of infrared light that is transmitted and received through the site of the body. That is, a change in volume of blood vessels is detected by a so-called optical method to obtain a volume pulse wave. Alternatively, in the present invention, the biological signal of the player may be obtained by using sensors of other types that obtain physiological information that occurs when the player performs physical activities. For example, the biological signal of the player may be obtained by detecting a change in pressure in blood vessels which is cause by pulsation of the arterial system, to obtain a pressure pulse wave as the biological signal of the player (e.g., by a piezoelectric method). Alternatively, a muscle potential or a heart potential of the player may be obtained as the biological signal of the player. The muscle potential or the heart potential can be detected by a commonly used method in which electrodes are used. For example, on the basis of a minute change in current in the player's body, the biological signal of the player can be obtained. Alternatively, a blood flow of the player may be obtained as the biological signal of the player. The blood flow is measured as a pulsating blood flow per heartbeat by using an electromagnetic method, an ultrasound method, or the like, whereby the pulsating blood flow is obtained as the biological signal of the player. A vital sensor may be attached to a site (e.g., a chest, an arm, an ear lobe, etc.) other than a finger of the player in order to obtain various biological signals described above. Strictly speaking, there may be a difference between the pulse and the heartbeat depending on the obtained biological signal. However, a heart rate and a pulse rate are considered to be substantially equal to each other, and thus the obtained biological signal can be processed in a manner similar to that of the aforementioned processing.

Further, in the above description, the game processing is performed by using the controller 7 (the vital sensor 76 and the core unit 70) and the game apparatus body 5 (i.e., the game apparatus 3). Alternatively, at least some of the process steps in the above game processing may be performed by using another apparatus. For example, when the game apparatus 3 is configured to be communicable with another apparatus (e.g., a server and another game apparatus), the process steps in the game processing may be performed by using the game apparatus 3 and the other apparatus in a cooperative manner. For example, when a virtual game world is set by the other apparatus, a case is considered where: a pulse wave signal outputted from the vital sensor 76 and key data outputted from the core unit 70 are transmitted to the other apparatus; the game processing thereafter is performed on the other apparatus; and then a display process is performed on the game apparatus 3. In another example, when a virtual game world is set by the other apparatus, a case is considered where: data halfway through the game processing (e.g., data indicating the position of the player character PC) is transmitted from the game apparatus 3 to the other apparatus; the process using the transmitted data is performed on the other apparatus; and then a display process is performed on the game apparatus 3. In this manner, by performing at least some of the process steps in the game processing on the other apparatus, processing similar to the game processing described above can be realized. In addition, the present invention is applicable to game processing that allows a plurality of players playing with individual game apparatuses to join a virtual game world realized on another apparatus (e.g., an on-line game that is operated on another apparatus and is joined and shared by a plurality of players playing with individual game apparatuses). The above game processing can be performed by one processor included in an information processing system that includes at least one information processing apparatus, or by multiple processors in the information processing system in a cooperative manner.

Further, in the above embodiment, the present invention is applied to the stationary game apparatus 3. The present invention is also applicable to any apparatus that includes at least a vital sensor and an information processing device for performing a process depending on information obtained from the sensor and the device. For example, the present invention is applicable to a commonly used personal computer, a mobile phone, a personal digital assistant (PDA), a hand-held game apparatus, and the like.

Further, in the above description, the core unit 70 and the game apparatus body 5 are connected to each other by wireless communication. Alternatively, the core unit 70 and the game apparatus body 5 may be electrically connected to each other via a cable. In this case, a cable connected to the core unit 70 is connected to a connection terminal of the game apparatus body 5.

Further, of the core unit 70 and the vital sensor 76 constituting the controller 7, only the core unit 70 is provided with the communication section 75. Alternatively, the vital sensor 76 may be provided with the communication section that wirelessly transmits biological information data to the game apparatus body 5. Alternatively, each of the core unit 70 and the vital sensor 76 may be provided with the communication section. For example, the communication sections provided in the core unit 70 and the vital sensor 76 may each wirelessly transmit biological information data or operation data to the game apparatus body 5. Alternatively, the communication section of the vital sensor 76 may wirelessly transmit biological information data to the core unit 70, and the communication section 75 of the core unit 70 may receive it. And thereafter, the communication section 75 of the core unit 70 may wirelessly transmit, to the game apparatus body 5, operation data of the core unit 70 along with the biological information data of the vital sensor 76. In these cases, the connection cable 79 for electrically connecting the core unit 70 to the vital sensor 76 is no longer required.

Further, the shape of the above core unit 70, and the shape, number, and arrangement or the like of the operation section 72 arranged thereon, are merely one example. The present invention can be achieved with other shapes, numbers, arrangements, and the like. Further, the shape of the above vital sensor 76, and the types, numbers, arrangements, and the like of the components provided therein, are also merely one example. The present invention can be achieved with other types, numbers, arrangements, and the like. Further, the coefficients, criteria, mathematical formulas, processing orders, and the like which are used in the above-described processing, are also merely one example. The present invention can be achieved with other values, mathematical formulas, and processing orders.

Further, the above game program may be supplied to the game apparatus body 5 not only from an external storage medium such as the optical disc 4, but also via a wireless or wired communication line. Further, the game program may be previously stored in a non-volatile storage device of the game apparatus body 5. Examples of the information storage medium having the game program stored thereon include a flexible disk, a hard disk, a magnetic optical disk, a magnetic tape, and a non-volatile memory in addition to a CD-ROM, a DVD, and any other optical disc-shaped storage medium similar to these media. Further, as the information storage medium storing thereon the game program, a volatile memory that stores the game program temporarily may be used.

While the invention has been described in detail, the foregoing description is in all aspects illustrative and not restrictive. It is understood that numerous other modifications and variations can be devised without departing from the scope of the invention. It should be understood that the scope of the present invention is defined only by the appended claims. It is also understood that one skilled in the art can implement the present invention in the equivalent range based on the description of the present invention and common technical knowledge, from the description of the specific embodiments of the present invention. Further, throughout the specification, it should be understood that terms in singular form include a concept of plurality. Thus, it should be understood that articles or adjectives indicating the singular form (e.g., "a", "an", "the", and the like in English) includes the concept of plurality unless otherwise specified. Further it should be understood that terms used in the present specification have meanings generally used in the art unless otherwise specified. Therefore, unless otherwise defined, all the jargons and technical terms have the same meanings as those generally understood by one skilled in the art of the present invention. In the event of any contradiction, the present specification (including meanings defined herein) has priority.

A storage medium having a game program stored thereon, a game apparatus, a game system, and a game processing method according to the present invention can realize, in a situation where a biological parameter is calculable based on a biological signal obtained from a player, a highly-responsive game processing based on the biological signal, and are useful as a game program, a game apparatus, a game system, a game processing method, and the like which perform a game processing based on a biological signal and/or a biological parameter of the player.

What is claimed is:

1. A computer-readable non-transitory storage medium having stored therein a game program which is executed by a computer of a game apparatus that is capable of calculating a biological parameter based on a biological signal repeatedly obtained from a sensor attached to a player, and performing a predetermined game process using the biological parameter, the game program causing the computer to operate as:
   a biological signal receiver which obtains the biological signal from the sensor;
   a sensor attachment detector which, based on the obtained biological signal, determines whether the sensor is attached to the player; and
   a first game unit configured to change the predetermined game process as shown on a display device according to at least one of a case where the sensor attachment detector determines that the sensor has changed from an attached state to a detached state and a case where the sensor attachment detector determines that the sensor has changed from the detached state to the attached state, wherein the first game unit changes the predetermined game process in accordance with a timing at which the determination is made.

2. The computer-readable non-transitory storage medium according to claim 1, wherein the sensor attachment detector determines that the sensor is in one of the attached state and the detached state if the value of the biological signal obtained by the biological signal receiver is equal to or greater than a threshold value, and determines that the sensor is in the other state if the value of the biological signal obtained by the biological signal receiver is smaller than the threshold value.

3. The computer-readable non-transitory storage medium according to claim 1, wherein the sensor attachment detector determines that the sensor is in one of the attached state and the detached state if the value of the biological signal obtained by the biological signal receiver is within a predetermined range, and determines that the sensor is in the other state if the value of the biological signal obtained by the biological signal receiver is outside the range.

4. The computer-readable non-transitory storage medium according to claim 1, wherein the sensor attachment detector determines that the sensor has changed from the attached state to the detached state or has changed from the detached state to the attached state if an amount of change in the value of the biological signal obtained by the biological signal receiver is equal to or greater than a predetermined threshold value, and determines that the sensor's attachment state is not changed if the amount of change in the value of the biological signal obtained by the biological signal receiver is smaller than the threshold value.

5. The computer-readable non-transitory storage medium according to claim 1, wherein the first game unit moves an object in a virtual game world in accordance with the timing at which the determination is made.

6. The computer-readable non-transitory storage medium according to claim 1, wherein the first game unit performs:
   a game starting process that, if the sensor attachment detector determines that the sensor has changed from the detached state to the attached state, starts a specific game from the timing at which the determination is made;
   an elapsed time counting process that counts an elapsed time after the game starting process has started the specific game; and
   a result process that, if the sensor attachment detector determines that the sensor has changed from the attached state to the detached state, performs a game process in accordance with the elapsed time that is counted by the elapsed time counting process at the timing when the determination is made.

7. The computer-readable non-transitory storage medium according to claim 6, wherein the first game process displays, on the display device, a game image representing a game in which a player competes for a time length from when the sensor attachment detector determines that the sensor has changed from the detached state to the attached state to when the sensor attachment detector determines that the sensor has changed from the attached state to the detached state;
   the game starting process displays, on the display device, a game image representing that the game is started, when the sensor attachment detector determines that the sensor has changed from the detached state to the attached state; and
   the result process displays, on the display device, a result according to the elapsed time counted by the elapsed time counting process, when the sensor attachment detector determines that the sensor has changed from the attached state to the detached state.

8. The computer-readable storage non-transitory medium according to claim 7, wherein the first game unit further performs a determination time setting process that sets a first determination time for determining, in the game in which the player competes for the time length, a rank of the game result with respect to the time length; and
   the result process displays, on the display device, the rank of the game result, depending on whether the elapsed time at the timing when the sensor attachment detector determines that the sensor has changed from the attached state to the detached state is shorter than the first determination time.

9. The computer-readable non-transitory storage medium according to claim 8, wherein the result process displays, on the display device, that the player has succeeded in the game, when the elapsed time at the timing when the sensor attachment detector determines that the sensor has changed from the attached state to the detached state is shorter than the first determination time; and
   the result process displays, on the display device, that the player has failed in the game, when the sensor attachment detector has not yet determined that the sensor has changed from the attached state to the detached state, at the timing when the elapsed time has reached the first determination time.

10. The computer-readable non-transitory storage medium according to claim 8, wherein the determination time setting process sets a second determination time shorter than the first determination time, for determining the rank of the game result;
    the result process displays, on the display device, that the player has succeeded in the game, when the elapsed time at the timing when the sensor attachment detector determines that the sensor has changed from the attached state to the detached state is equal to or longer than the second determination time and is shorter than the first determination time;
    the result process displays, on the display device, that the player has failed in the game, when the elapsed time at the timing when the sensor attachment detector determines that the sensor has changed from the attached state to the detached state is shorter than the second determination time; and
    the result process displays, on the display device, that the player has failed in the game, when the sensor attachment detector has not yet determined that the sensor has changed from the attached state to the detached state, at the timing when the elapsed time has reached the first determination time.

11. The computer-readable non-transitory storage medium according to claim 8, wherein the result process displays, on the display device, in addition to the rank of the game result, a game result depending on a difference between the first determination time and the elapsed time at the timing when the sensor attachment detector determines that the sensor has changed from the attached state to the detached state.

12. The computer-readable non-transitory storage medium according to claim 8, wherein the result process represents that the player has succeeded in the game, and displays, on the display device, a game score depending on the elapsed time, when the elapsed time at the timing when the sensor attachment detector determines that the sensor has changed from the attached state to the detached state is shorter than the first determination time.

13. The computer-readable non-transitory storage medium according to claim 1, wherein the first game process performs a game in which a player competes for whether an object selected by the player from among a plurality of objects is a right object or a wrong object; and the first game process includes:
    an object selection process that, when the sensor attachment detector determines that the sensor has changed from the detached state to the attached state, selects one object from among the plurality of objects in accordance with the timing at which the determination is made; and a result process that determines whether the object selected by the object selection process is a right object or a wrong object.

14. The computer-readable non-transitory storage medium according to claim 13, wherein the first game process displays, on the display device, a game image representing the game; and the result process displays, on the display device, a result of the determination as to whether the object selected by the object selection process is a right object or a wrong object.

15. The computer-readable non-transitory storage medium according to claim 14, wherein the result process displays, when the sensor attachment detector determines that the sensor has changed from the attached state to the detached state after the object selection process selects one of the plurality of objects, a result of the determination as to whether the object selected by the object selection process is a right object or a wrong object, on the display device, in accordance with the timing at which the determination is made.

16. The computer-readable non-transitory storage medium according to claim 14, wherein the object selection process successively changes, in a predetermined cycle, an object selectable from the plurality of objects, and selects, as the one object, an object that is selectable at the timing when the sensor attachment detector determines that the sensor has changed from the detached state to the attached state.

17. The computer-readable non-transitory storage medium according to claim 1, wherein the game program further causes the computer to perform:

a game selection process that selects one game from among a plurality of games in accordance with an operation performed by a player;

a first process that, when the game selection process selects a first game, performs a game process corresponding to the first game by causing the computer to function as the biological signal receiver, the sensor attachment detector, and the first game unit; and a second process that, when the game selection process selects a second game, performs a process different from the game process performed by the first game process;

wherein the second process includes:
a biological parameter calculation process that calculates a biological parameter of the player, based on a biological signal that is repeatedly obtained from the sensor; and
a second game process that performs a game process corresponding to the second game by using the biological parameter calculated by the biological parameter calculation process.

18. The computer-readable non-transitory storage medium according to claim 8, wherein the game program further causes the computer to function as biological parameter calculator that calculates a biological parameter of the player, based on a biological signal that is repeatedly obtained from the sensor; and the determination time setting process changes the first determination time in accordance with the biological parameter calculated by the biological parameter calculator.

19. The computer-readable non-transitory storage medium according to claim 1, wherein the sensor detects a pulse wave of the player, and outputs the pulse wave of the player as the biological signal; and the sensor attachment detector determines whether the sensor is attached to the player, by determining a value itself of the pulse wave indicated by the biological signal.

20. The computer-readable non-transitory storage medium according to claim 1, wherein the sensor includes:
an infrared light emitter that emits infrared light; and
an infrared light receiver that, when the sensor is attached to the player, receives the infrared light emitted from the infrared light emitter via a part of the body of the player, and directly receiving, when the sensor is not attached to the player, the infrared light emitted from the infrared light emitter and then outputting, as the biological signal, a photoelectric voltage according to the received light; and
the sensor attachment detector determines the value itself of the photoelectric voltage to determine whether the sensor is attached to the player.

21. A game apparatus which is capable of calculating a biological parameter based on a biological signal repeatedly obtained from a sensor attached to a player, and performing a game process shown on a display device using the biological parameter, the game apparatus comprising:

a biological signal receiver configured to receive the biological signal;

a sensor attachment detector configured to determine, based on the biological signal, whether the sensor is attached to the player; and a first game unit configured to perform the game process in response to at least one of a case where the sensor attachment detector determines that the sensor has changed from its attached state to its detached state and a case where the sensor attachment detector determines that the sensor has changed from its detached state to its attached state.

22. A game system which includes a plurality of apparatuses communicable with each other, and is capable of calculating a biological parameter based on a biological signal repeatedly obtained from a sensor attached to a player, and performing a game process shown on a display device using the biological parameter, the game system comprising:

a biological signal receiver configured to receive the biological signal;

a sensor attachment detector configured to, based on the biological signal, determine whether the sensor is attached to the player; and a first game unit configured to perform the game process in response to at least one of a case where the sensor attachment detector determines that the sensor has changed from its attached state to its detached state and a case where the sensor attachment detector determines that the sensor has changed from its detached state to its attached state.

23. A game processing method which is executed by one processor included in an information processing system that includes at least one information processing apparatus that is capable of calculating a biological parameter based on a biological signal repeatedly obtained from a sensor attached to a player, and performing a game process shown on a display device using the biological parameter, or by multiple processors in the information processing system in a cooperative manner, the game processing method comprising:

obtaining the biological signal;

determining, based on the biological signal, whether the sensor is attached to the player; and performing the game process in response to at least one of a case where the sensor attachment determining step determines that the sensor has changed from its attached state to its detached state and a case where the sensor attachment determining step determines that the sensor has changed from its detached state to its attached state.

* * * * *

UNITED STATES PATENT AND TRADEMARK OFFICE
CERTIFICATE OF CORRECTION

Page 1 of 1

PATENT NO. : 8,678,935 B2
APPLICATION NO. : 12/856885
DATED : March 25, 2014
INVENTOR(S) : Abe et al.

It is certified that error appears in the above-identified patent and that said Letters Patent is hereby corrected as shown below:

On the Title Page, item (73) Assignee, insert --Nintendo Co., Ltd., Kyoto (JP)-- and --Tohoku University, Miyagi (JP)--.

Signed and Sealed this
Eighth Day of July, 2014

Michelle K. Lee
*Deputy Director of the United States Patent and Trademark Office*